United States Patent
Emmons et al.

(10) Patent No.: US 10,458,668 B2
(45) Date of Patent: *Oct. 29, 2019

(54) AIR QUALITY BASED VENTILATION CONTROL FOR HVAC SYSTEMS

(71) Applicant: Ademco Inc., Golden Valley, MN (US)

(72) Inventors: David J. Emmons, Plymouth, MN (US); Brad Terlson, Maple Grove, MN (US); Amy Ragland, Brooklyn Center, MN (US); David Quam, Golden Valley, MN (US); Brad Paine, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 132 days.

This patent is subject to a terminal disclaimer.

(21) Appl. No.: 15/452,084

(22) Filed: Mar. 7, 2017

(65) Prior Publication Data

US 2017/0176030 A1    Jun. 22, 2017

Related U.S. Application Data

(63) Continuation of application No. 13/952,256, filed on Jul. 26, 2013, now Pat. No. 9,618,224.

(51) Int. Cl.
*G06F 19/00*  (2018.01)
*F24F 11/00*  (2018.01)
(Continued)

(52) U.S. Cl.
CPC .......... *F24F 11/0001* (2013.01); *F24F 11/30* (2018.01); *F24F 11/62* (2018.01);
(Continued)

(58) Field of Classification Search
CPC ........ F24F 11/0001; F24F 11/30; F24F 11/58; F24F 11/62; F24F 11/65;
(Continued)

(56) References Cited

U.S. PATENT DOCUMENTS

| 4,266,599 A | 5/1981 | Saunders et al. |
| 4,308,911 A | 1/1982 | Mandl |

(Continued)

FOREIGN PATENT DOCUMENTS

| CN | 201126229 Y | 10/2008 |
| CN | 102235728 A | 11/2011 |

(Continued)

OTHER PUBLICATIONS

Ackerly et al., "Occupant Response to Window Control Signaling Systems," Center for the Built Environment, CBE, Summary Report, 28 pages, Apr. 2011.

(Continued)

*Primary Examiner* — Kidest Bahta
(74) *Attorney, Agent, or Firm* — Shumaker & Sieffert, P.A.

(57) ABSTRACT

An HVAC controller and/or server may be programmed to determine if ventilation of a building is desired based, at least in part, on the one or more user-specified air quality thresholds stored in a memory, and one or more of a measure of indoor air quality and a measure of outdoor air quality. The air quality parameter threshold may relate to an air quality index, an air pollutant concentration, a smog alert, a pollen count, a dew point, a chance of precipitation, and/or the like. In addition, the HVAC controller and/or server may take into account current or future weather conditions when determining the ventilation needs of a building. Upon determining that ventilation is needed or recommended, the HVAC controller may send or display a message to the user. The message may recommendation that the user open a window or operate a ventilation system, as desired.

17 Claims, 17 Drawing Sheets

(51) Int. Cl.

| | | |
|---|---|---|
| *G05B 19/048* | (2006.01) | |
| *F24F 11/30* | (2018.01) | |
| *F24F 11/62* | (2018.01) | |
| F24F 110/10 | (2018.01) | |
| F24F 110/12 | (2018.01) | |
| F24F 110/20 | (2018.01) | |
| F24F 110/22 | (2018.01) | |
| F24F 110/50 | (2018.01) | |
| F24F 110/52 | (2018.01) | |
| F24F 130/00 | (2018.01) | |
| F24F 130/10 | (2018.01) | |
| F24F 11/65 | (2018.01) | |
| F24F 11/58 | (2018.01) | |

(52) U.S. Cl.
CPC ............ *G05B 19/048* (2013.01); *F24F 11/58* (2018.01); *F24F 11/65* (2018.01); *F24F 2011/0002* (2013.01); *F24F 2110/10* (2018.01); *F24F 2110/12* (2018.01); *F24F 2110/20* (2018.01); *F24F 2110/22* (2018.01); *F24F 2110/50* (2018.01); *F24F 2110/52* (2018.01); *F24F 2130/00* (2018.01); *F24F 2130/10* (2018.01); *G05B 2219/2614* (2013.01); *Y02B 30/78* (2013.01)

(58) Field of Classification Search
CPC ........... F24F 2011/0002; F24F 2110/10; F24F 2110/12; F24F 2110/20; F24F 2110/22; F24F 2110/50
See application file for complete search history.

(56) References Cited

U.S. PATENT DOCUMENTS

| | | | |
|---|---|---|---|
| 4,338,791 A | 7/1982 | Stamp, Jr. et al. | |
| 4,353,409 A | 12/1982 | Saunders et al. | |
| 4,567,939 A | 2/1986 | Dumbeck | |
| 5,261,596 A * | 11/1993 | Tachibana | F24F 11/30 |
| | | | 236/49.3 |
| 5,292,280 A * | 3/1994 | Janu | F24F 7/08 |
| | | | 454/229 |
| 5,462,485 A * | 10/1995 | Kinkead | F24F 11/0001 |
| | | | 454/256 |
| 5,822,997 A | 10/1998 | Atterbury | |
| 5,902,183 A | 5/1999 | D'Souza | |
| 5,909,378 A | 6/1999 | De Milleville | |
| 6,216,756 B1 | 4/2001 | Mason | |
| 6,269,650 B1 | 8/2001 | Shaw | |
| 6,478,233 B1 | 11/2002 | Shah | |
| 6,941,193 B2 | 9/2005 | Freeska et al. | |
| 6,968,295 B1 | 11/2005 | Carr | |
| 7,302,313 B2 | 11/2007 | Sharp et al. | |
| 7,434,413 B2 | 10/2008 | Wruck | |
| 7,839,275 B2 | 11/2010 | Spalink et al. | |
| 8,063,775 B2 | 11/2011 | Reed et al. | |
| 8,121,734 B2 | 2/2012 | Larsen et al. | |
| 8,165,721 B2 | 4/2012 | Petit | |
| 8,239,066 B2 | 8/2012 | Jennings et al. | |
| 9,593,861 B1 * | 3/2017 | Burnett | F24F 11/30 |
| 9,618,224 B2 | 4/2017 | Emmons et al. | |
| 2004/0083029 A1 * | 4/2004 | Bicknell | G05D 23/1931 |
| | | | 700/276 |
| 2004/0117330 A1 | 6/2004 | Ehers et al. | |
| 2004/0230344 A1 | 11/2004 | Gallupe et al. | |
| 2005/0021710 A1 | 1/2005 | Johnson et al. | |
| 2005/0038567 A1 | 2/2005 | Maeda et al. | |
| 2007/0264927 A1 * | 11/2007 | Choi | F24F 11/0001 |
| | | | 454/196 |
| 2008/0015740 A1 | 1/2008 | Osann, Jr. | |
| 2008/0217418 A1 | 9/2008 | Helt et al. | |
| 2009/0308372 A1 | 12/2009 | Nordberg et al. | |
| 2010/0025483 A1 | 2/2010 | Hoeynck et al. | |
| 2010/0036531 A1 | 2/2010 | Chessel et al. | |
| 2010/0070082 A1 | 3/2010 | Chessel et al. | |
| 2010/0070086 A1 | 3/2010 | Harrod et al. | |
| 2010/0102973 A1 | 4/2010 | Grohman et al. | |
| 2010/0211224 A1 | 8/2010 | Keeling et al. | |
| 2010/0304193 A1 | 12/2010 | Karlsson et al. | |
| 2010/0318227 A1 | 12/2010 | Steinberg et al. | |
| 2011/0035061 A1 | 2/2011 | Altonen et al. | |
| 2011/0223850 A1 | 9/2011 | Narayanamurthy et al. | |
| 2012/0095601 A1 | 4/2012 | Abraham et al. | |
| 2012/0145802 A1 | 6/2012 | Peterson et al. | |
| 2012/0165993 A1 | 6/2012 | Whitehouse | |
| 2012/0221151 A1 | 8/2012 | Steinberg | |
| 2012/0232702 A1 | 9/2012 | Vass et al. | |
| 2012/0239603 A1 | 9/2012 | Raestik et al. | |
| 2012/0245740 A1 | 9/2012 | Raestik et al. | |
| 2012/0259470 A1 | 10/2012 | Nijhawan et al. | |
| 2013/0174646 A1 * | 7/2013 | Martin | G01N 33/00 |
| | | | 73/31.02 |

FOREIGN PATENT DOCUMENTS

| | | |
|---|---|---|
| JP | 2005003321 A | 1/2005 |
| JP | 2006329584 A | 12/2006 |
| JP | 2007172406 A | 7/2007 |
| JP | 2009076106 A | 4/2009 |
| JP | 2010065937 A | 3/2010 |
| JP | 20117366 A | 1/2011 |
| WO | 2010144451 A2 | 12/2010 |
| WO | 2012024692 A2 | 2/2012 |
| WO | 2012047938 A2 | 4/2012 |

OTHER PUBLICATIONS

Bourgeois et al., "Hybrid Ventilation of Canadian Non-Domestic Buildings: A Procedure for Assessing IAQ, Comfort and Energy Conservation," Air Distribution in Rooms, (ROOMVENT 2000), pp. 761-766, Jul. 9-12, 2000.

Henze et al., "HVAC Control Algorithms for Mixed Mode Buildings," United States Green Building Council Green Building Research Fund Final Report, 133 pages, May 25, 2002.

Prosecution History from U.S. Appl. No. 13/952,256, dated Nov. 5, 2015 through Nov. 30, 2016, 87 pp.

* cited by examiner

456 — Ventilation conditions will be favorable from now until 7:30am tomorrow.
460 — Ventilate?

Yes [X]   No [ ]

AIR QUALITY BASED VENTILATION CONTROL FOR HVAC SYSTEMS

This is a continuation application of co-pending U.S. patent application Ser. No. 13/952,256, filed Jul. 26, 2013, and entitled "AIR QUALITY BASED VENTILATION CONTROL FOR HVAC SYSTEMS", which is incorporated herein by reference.

TECHNICAL FIELD

The present disclosure relates generally to HVAC controllers and more particularly to HVAC controllers configured to determine ventilation needs of a building based, at least in part, on a measure of air quality.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Ventilation may be used to introduce fresh air into the building or structure to improve the overall indoor air quality, and, in some instances, reduce the HVAC system's energy demands. Ventilation may be provided by mechanical/forced air ventilator, an economizer, or simply by opening one or more windows of the building. Because the need for ventilation is dependent on a variety of factors, such as the enthalpy of the indoor and outdoor air, the air quality of the indoor and outdoor air, and/or other factors, it may be difficult for the occupants to determine when ventilation is needed and/or beneficial.

SUMMARY

The present disclosure relates generally to HVAC controllers and more particularly to HVAC controllers configured to determine ventilation needs of a building based, at least in part, on a measure of air quality.

In one illustrative embodiment, a building controller may be configured to communicate with and control one or more components of an HVAC system. The building controller may include, for example, an input/output port for sending and/or receiving data over a network; a memory for storing one or more operating parameters including one or more user-specified air quality thresholds, and a user interface. The building controller may also include a controller coupled to the input/output port, the memory, and the user interface. The controller may be configured to receive and accept one or more user-specified air quality thresholds from a user via the user interface. Additionally, the controller may be configured to receive a first signal indicative of a measure of indoor air quality and a second signal indicative of a measure of outdoor air quality. The controller may be configured to determine if ventilation of the building is desired based, at least in part, on the one or more user-specified air quality thresholds stored in the memory and one or more of the measure of indoor air quality and the measure of outdoor air quality. In some instances, the controller may provide an alert on the user interface of the building controller when the controller determines that ventilation of the building is desired. In some cases, the alert may notify the user that window ventilation is desired. In some cases, an alert may be provided on a user interface of a mobile computing device (such as a mobile phone, tablet computer, lap top computer, etc.) when the controller determines that ventilation of the building is desired.

In another illustrative embodiment, a server may be provided. The server may be connectable to a building controller located within a building over a network. The server may include a data storage device for storing data indicative of environmental conditions inside of and outside of the building. This data may be retrieved from any number of sources including, for example, the building controller for environmental conditions inside of the building, other servers such as servers hosting weather, smog and other data, and/or any other suitable source of data. The controller may be configured to monitor the data indicative of environmental conditions inside of and outside of the building and determine if ventilation of the building is desired based, at least in part, on the data indicative of environmental conditions inside of and outside of the building, and in some cases on one or more user-specified air quality thresholds. The server may include an input/output block for providing an alert to a user when the controller determines that ventilation of the building is desired. For example, the server may provide an alert to the building controller for presentation to a user of the building controller and/or to a mobile computing device for presentation to a user of the mobile computing device.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIGS. 6-17 are exemplary screens that may be displayed via a user interface of an HVAC controller and/or mobile device.

Figure 1:
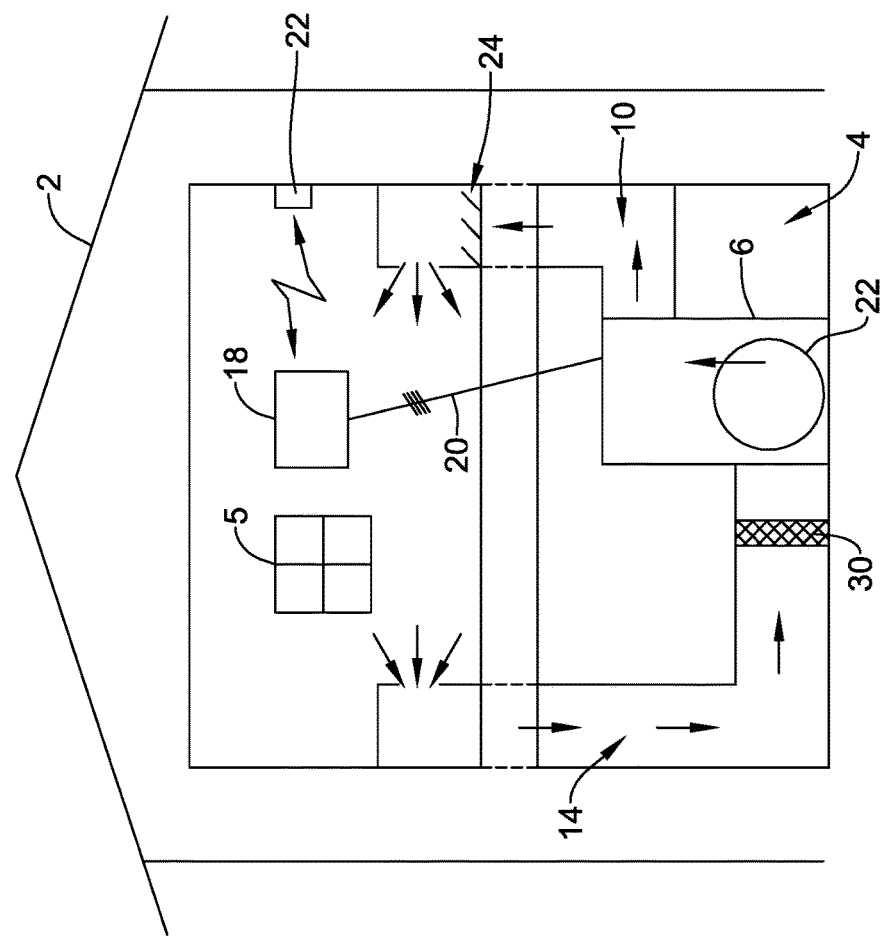
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 including one or more operable windows 5. The illustrative building 2 has a heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. While the HVAC system 4 shown in FIG. 1 is primarily located within the building 2, it will be generally understood that, in some embodiments, one or more of the HVAC components may be positioned outside of the building such as on a rooftop of the building. The one or more HVAC components 6 may include, but are not limited to, a furnace, a heat pump, an electric heat pump, a geothermal heat pump, an electric heating unit, an air conditioning unit, a damper, a valve, and/or the like. In some cases, the one or more HVAC components may include one or more indoor air quality (IAQ) components including, but not limited to, a humidifier, a dehumidifier, an air exchanger, an economizer, one or more dampers and/or valves, and/or the like. In some instances, the HVAC system 4 may also include a ventilation system (e.g. an air exchanger, an economizer, etc.) that is adapted to ventilate the building 2 with fresh air from outside the building, and may be a mechanical/forced air ventilator or a natural ventilation system. In a natural ventilation system, one or more operable windows 5 may be used (i.e. opened), at least in part, to ventilate the building. In some cases, at least one of the one or more windows 5 may be a power operated window that is configured to open and/or close upon receiving a signal or command from the HVAC controller 18.

It is contemplated that the HVAC controller(s) 18 may be configured to control the comfort level in the building 2 or structure by activating and deactivating the HVAC component(s) 6 in a controlled manner. Additionally, it is contemplated that the HVAC controller(s) may be configured to at least partially control the indoor air quality in the building or structure by activating and deactivating one or more IAQ components, as described herein. In some cases, the HVAC controller 18 may notify the user as to when one or more windows may be opened and/or closed to ventilate the building 2 or structure. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some cases, the temperature sensor may be located remotely from the thermostat. Additionally, in some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device that may allow one or more of the HVAC components 6, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

Figure 2:
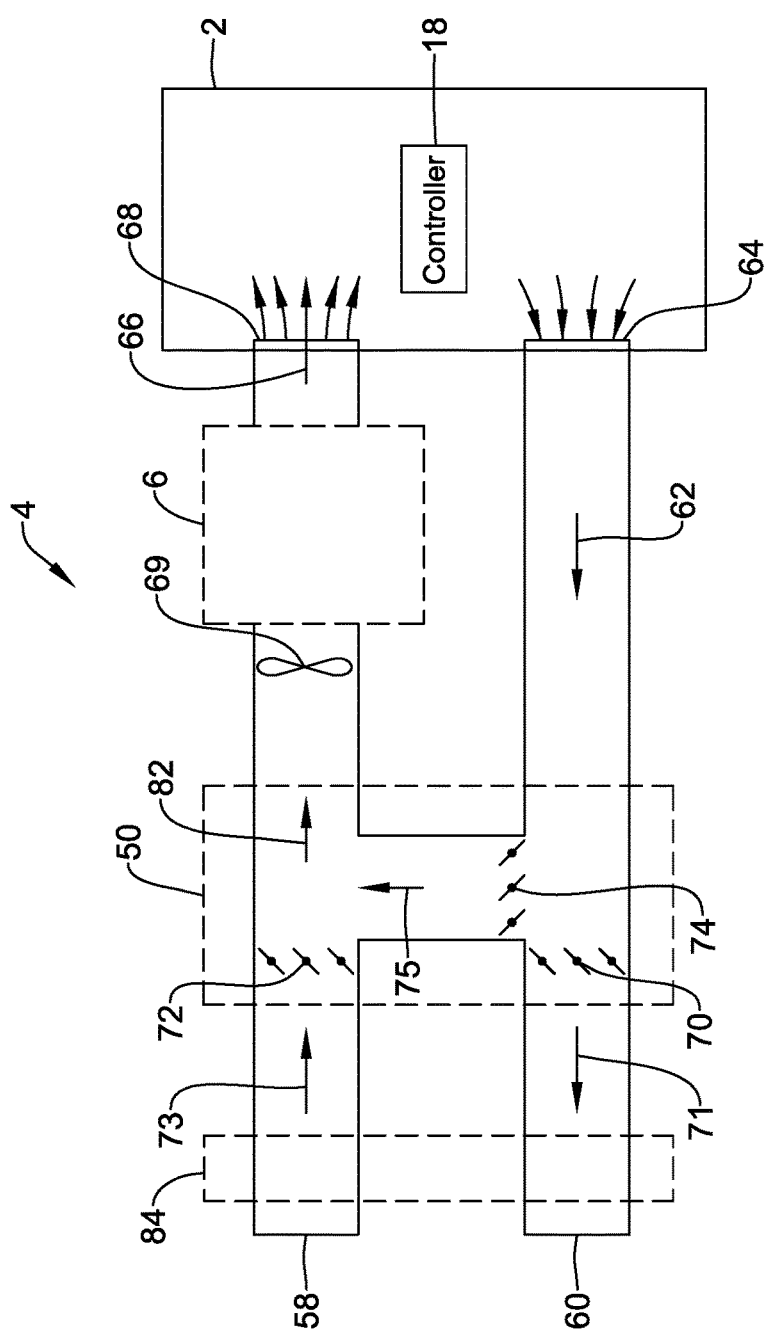
FIG. 2 is a schematic view of an illustrative ventilation system that may be incorporated into the HVAC system shown in FIG. 1.

FIG. 2 provides a schematic view of an exemplary ventilation system 50 that may be incorporated into the HVAC system 4 as described herein with reference to FIG. 1. In some instances, the ventilation system 50 may be a demand control ventilation system such as shown and described in U.S. Pat. No. 8,364,318 entitled "DEMAND CONTROL VENTILATION SYSTEM WITH FAN SPEED CONTROL", which is incorporated herein by reference in its entirety for all purposes, but this is not required. It will be generally understood that different types of ventilation systems may be incorporated in to the HVAC system 4, as described herein, depending upon the building design and the ventilation needs of the building. In some cases, as shown, the ventilation system 50 may be located upstream of the one or more HVAC components 6 such as, for example, a heating and/or an air conditioning unit, but this is not required.

As shown in FIG. 2, the ventilation system 50 may include an outside air intake 58 and/or an exhaust vent 60.

A return air stream 62 may be provided for drawing return air from the inside space of the building 2 through one or more return registers 64. The illustrative HVAC system 4 also includes a fan 69, which may be a single, multiple or infinitely variable multiple speed fan, which can be controlled by a controller (e.g. HVAC controller 18) to induce a desired air flow through one or more HVAC components 6 such as, for example, a furnace or air conditioning unit and to the building 2 as shown at 66 through one or more supply registers 68. As shown, the ventilation system 50 may employ one or more dampers to control air flows within the various ducts of the ventilation system 50 of the HVAC system 4. These dampers may include an exhaust damper 70 to regulate the fraction of the return air stream 62 that is exhausted 71 from the building 2, an intake damper 72 to regulate the flow of an incoming outside air stream 73 into the building 2, and/or a return damper 74 to regulate the flow of the retained return air stream 75 to mix with the incoming outside air stream 73. In some cases, the dampers 70, 72, and/or 74 may be mechanically coupled together to open and close in a coordinated manner, but this is not required. For example, in some illustrative embodiments, dampers 70 and 72 may open and close together or in sequence, and damper 74 may open and close in an opposite manner to dampers 70 and 72. It will be generally understood that more or fewer of the dampers 70, 72, and 74 may be employed, depending on the HVAC system 4, the size of the building 2, and/or the building's ventilation requirements.

In some embodiments, the ventilation system 50, including the dampers 70, 72, 74 and associated duct work, may be included in an economizer. Under some conditions, such an economizer may be used to provide free cooling by mixing cooler incoming outside air 73 with the sometimes warmer retained return air 75 to provide a cooler mixed air stream 82. In some instances, the HVAC system 4 may include a heat exchanger generally shown at 84 to transfer heat energy between the incoming outside air stream 73 and the exhausted air stream 71, which may be useful under some operating conditions.

Figure 3:
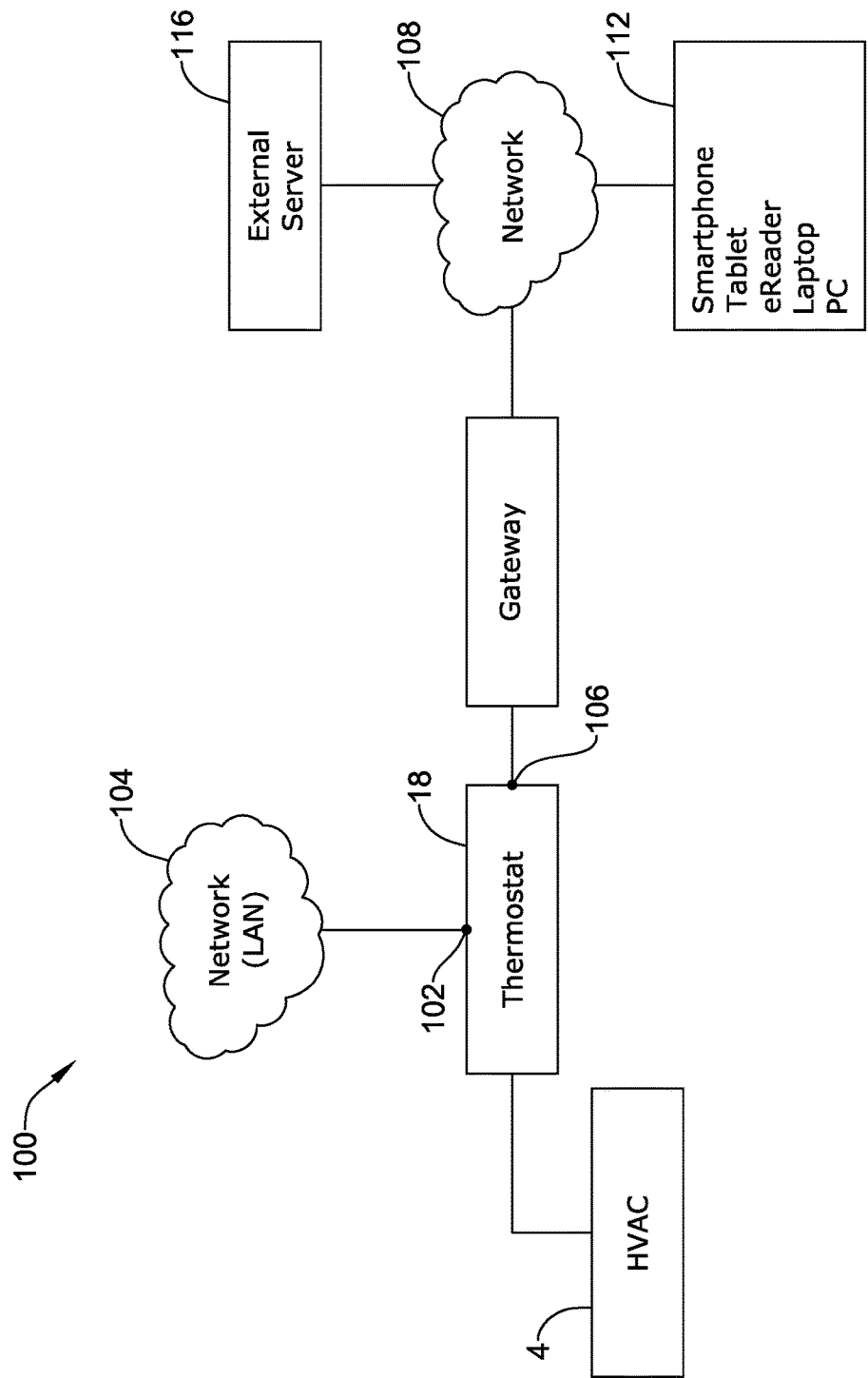
FIG. 3 is a schematic view of an illustrative HVAC control system that may facilitate access and/or control of the HVAC system of FIG. 1.

FIG. 3 is a schematic view of an illustrative HVAC control system 100 that facilitates remote access and/or control of the HVAC system 4, as shown in FIG. 1. As discussed herein, the HVC system 4 may incorporate a ventilation system such as, for example, ventilation system 50 as shown in FIG. 2. The illustrative HVAC control system 100 may include an HVAC controller, as for example, HVAC controller 18 (see FIG. 1) that is configured to communicate with and control one or more components 6 of the HVAC system 4. Additionally, in some cases, the HVAC controller 18 may be configured to communicate with and/or control the one or more dampers 70, 72, and/or 74 of the ventilation system 50 of the HVAC system 4 to ventilate and, in some instances, provide free heating and/or cooling to the building 2.

The HVAC controller 18 may communicate with the one or more components 6 of the HVAC system 4 and/or the one or more dampers of the ventilation system 50 via a wired or wireless link. Additionally, the HVAC controller 18 may be adapted to communicate over one or more wired or wireless networks that may facilitate remote access and/or control of the HVAC controller 18 via another device such as a smart phone, a PDA, a tablet computer, a laptop or personal computer, wireless network-enabled key fobs, an e-reader and/or the like. As shown in FIG. 3, the HVAC controller 18 may include a first communications port 102 for communicating over a first network 104, and in some cases, a second communications port 106 for communicating over a second network 108. In some cases, the first network 104 (when provided) may be a wireless local area network (LAN), and the second network 108 (when provided) may be a wide area network or global network (WAN) including, for example, the Internet. In some cases, the wireless local area network 104 may provide a wireless access point and/or a network host device that is separate from the HVAC controller 18. In other cases, the wireless local area network 104 may provide a wireless access point and/or a network host device that is part of the HVAC controller 18. In some cases, the wireless local area network 54 may be an ad-hoc wireless network, but this is not required.

Depending upon the application and/or where the HVAC user is located, remote access and/or control of the HVAC controller 18 may be provided over the first network 104 and/or the second network 108. A variety of remote wireless devices 112 may be used to access and/or control the HVAC controller 18 from a remote location (e.g. remote from HVAC Controller 18) over the first network 104 and/or second network 108 including, but not limited to, mobile phones including smart phones, PDAs, tablet computers, laptop or personal computers, wireless network-enabled key fobs, e-readers and the like.

In many cases, the remote wireless devices 112 are configured to communicate wirelessly over the first network 104 and/or second network 108 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 108 with an external web service hosted by one or more external servers 116. A non-limiting example of such an external web service is Honeywell's TOTAL CONNECT™ web service. The HVAC controller 18 may be configured to upload selected data via the network 108 to the external web service where it may be collected and stored on the external server 66. In some cases, the data may be indicative of the performance of the HVAC system 4. In some cases, the data may be indicative of indoor air quality and/or outdoor air quality (e.g. temperature, humidity, CO concentration, particulate contamination (dust, pollen, etc)). Additionally, the HVAC controller 18 may be configured to receive and/or download selected data, settings and/or services including software updates from the external web service over the second network 108. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, comfort and/or economy settings, user-specified air quality thresholds, start times, end times, schedules, window frost protection settings, and/or the like. Additionally, the HVAC controller 18 may receive outdoor air quality data. Exemplary outdoor air quality data may include, but is not limited to a current outdoor temperature and/or outdoor humidity, weather related data, pollen forecast and/or pollen count, a current air pollutant concentration, an air quality index and/or air quality alert, a smog alert, and/or the like. An air pollutant concentration may include an ozone concentration, a particulate matter concentration, a carbon monoxide concentration, a nitrogen oxides ($NO_x$) concentration, a sulfur dioxide concentration, and/or a lead concentration, but not limited to these. The weather related data may include a current weather forecast and/or may include severe weather alerts and other outdoor air quality risks such as, for example, a UV index, a heat index, a heat advisory, a wind chill, wind direction and/or wind speed. The weather data may be provided to the HVAC controller 18 by a different external server such as, for example, a web server maintained by the National Weather Service. In some instances, the external server 66 may collect appropriate air quality data from one or more other servers, and may deliver data to the HVAC controller 18. In some cases, the HVAC controller 18 may perform some or all of the determination of whether ventilation is desired based on internal and/or external air quality. In some cases, the external server 66 may perform some or all of the determination of whether ventilation is desired based on internal and/or external air quality, and may communicate results to the HVAC controller 18. These are just some examples.

Figure 4:
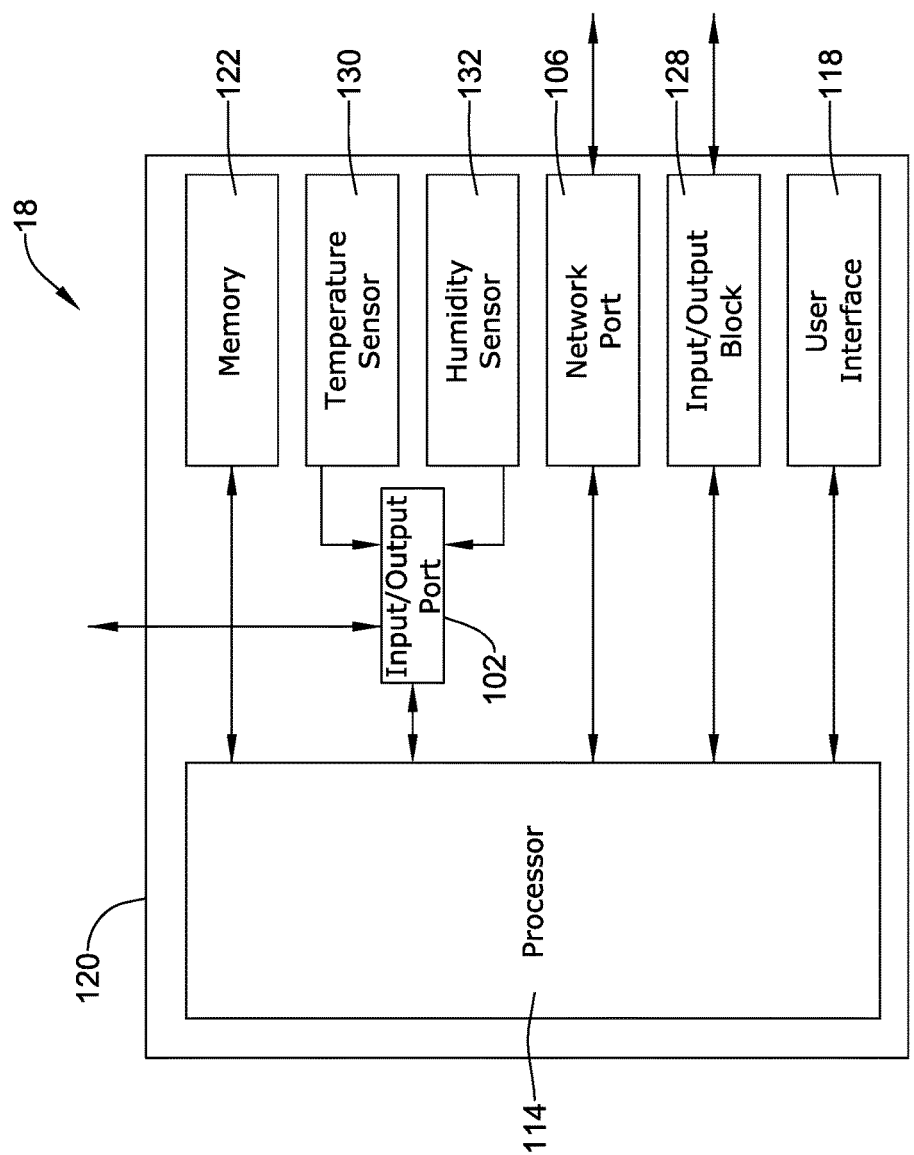
FIG. 4 is a schematic block diagram of an illustrative HVAC controller.

FIG. 4 is a schematic view of an illustrative HVAC controller 18 of a thermal comfort control system. In some instances, the HVAC controller 18 may be a thermostat, but this is not required. Additionally, in some cases, the HVAC controller 18 may be accessed and/or controlled from a remote location over a network 108 (FIG. 3) using a mobile wireless device 112 such as, for example, a smart phone, a PDA, a tablet computer, a laptop or personal computer, a wireless network-enabled key fob, an e-reader, and/or the like. As shown in FIGS. 3 and 4, the illustrative HVAC controller 18 may include an input port 102 for communicating with one or more internal and/or remotely located sensors. In some cases, the input port 102 may be in communication with one or more internal sensors. In addition, the input port 102 may be adapted to receive a signal indicative of a measure related to an environmental condition inside or outside of the building. In some cases, the input port 102 may receive the measure related to an environmental condition inside or outside of the building over a wireless network such, as for example, a wireless LAN, but this is not required. The network port 106 may be a wired communications port. In other cases, the network port 106 may be a wireless communications port including a wireless transceiver for sending and/or receiving signals over a wireless network such as for example a wireless local area network (LAN) or a wide area network (WAN) such as, for example, the Internet 108. In some cases, the network port 106 may be in communication with a wired or wireless router or gateway for connecting to the network 108, but this is not required. In some cases, the router or gateway may be integral to the HVAC controller 18 or may be provided as a separate device.

Additionally, the illustrative HVAC controller 18 may include a processor (e.g. microprocessor, microcontroller, etc.) 114 and a memory 122. The processor 114 may be in communication the input port 102 and/or the network port 106 and with the memory 122. The processor 114 and the memory 122 may be situated within a housing 120 that may include at least one bracket for mounting the HVAC controller 18 to a wall located within the building or structure. In addition, the HVAC controller 18 may include a user interface 118 including a display, but this is not required. In some instances, the user interface 118 may be secured relative to the housing 120. In other instances, the user interface 118 may be located at a remote device such as any one of the remote devices disclosed herein.

In some cases, HVAC controller 18 may include a timer (not shown). The timer may be integral to the processor 114 or may be a separate component. The HVAC controller 18 may optionally include an input/output block (I/O block) 128 for receiving one or more signals from the HVAC system 4 and/or for providing one or more control signals to the HVAC system 4. For example, the I/O block 128 may communicate with one or more HVAC components 6 of the HVAC system 4. Alternatively, or in addition to, the I/O block 128 may communicate with another controller, which is in communication with one or more HVAC components of the HVAC system 4, such as a zone control panel in a zoned HVAC system, equipment interface module (EIM), or any other suitable building control device.

The illustrative HVAC controller 18 may include an internal temperature sensor 130 located within the housing 120, but this is not required. The HVAC controller may also include an internal humidity sensor 132 located within the housing 120, but this is also not required. When provided, the temperature sensor 130 and/or the humidity sensor 132 may be coupled to the input port 102 which, in turn, is coupled to the processor 114. In some cases, the HVAC controller 18 may communicate with one or more remote temperature sensors, humidity sensors, occupancy and/or other sensors located throughout the building or structure via, for example, the input port 102 and/or network port 106. Additionally, in some cases, the HVAC controller may communicate with a temperature sensor and/or humidity sensor located outside of the building or structure for sensing an outdoor temperature and/or humidity if desired. As such, and in some cases, the HVAC controller 18 may receive at least one of a measure related to an indoor temperature inside the building or structure, a measure related to an indoor humidity inside the building or structure, and a measure related to an outdoor temperature and/or outdoor humidity outside of the building or structure.

In some cases, the HVAC controller 18 may receive outdoor air quality related data including data indicative of an outdoor air quality parameter via the network port 106. The outdoor air quality related data may include a current outdoor temperature and/or outdoor humidity, weather related data, pollen forecast and/or pollen count, a current air pollutant concentration, an air quality index and/or air quality alert, a smog alert, and/or the like. An air pollutant concentration may include an ozone concentration, a particulate matter concentration, a carbon monoxide concentration, a nitrogen oxides ($NO_x$) concentration, a sulfur dioxide concentration, and/or a lead concentration, but not limited to these. Because of their possible effect on public health, these six common air pollutants are monitored by different agencies and reported by to the Environmental Protection Agency (EPA). The weather related data may include a current or future weather forecast and/or may include severe weather alerts and other outdoor air quality risks such as, for example, a UV index, a heat index, a wind chill, wind direction and/or wind speed. Severe weather alerts may include, but are not limited to, such as for example, a thunderstorm watch or warning, a tornado watch or warning, a flash flood watch or warning, and/or the like. These are just some examples of outdoor air quality related data that may be received by the HVAC controller 18. Such severe weather alerts and/or information about other air quality risks may be displayed as an alert to the user via the display of the HVAC controller 18. Additionally, an air quality alert, a pollen forecast or related alert, a smog alert, an air quality index alert and/or heat advisory, but not limited to these, may also be displayed to the user via the display of the HVAC controller 18. In some cases, the air quality alert may indicate the short term and/or long term health risks associated with the air quality alert.

The processor 114 may operate in accordance with an algorithm that controls or at least partially controls one or more HVAC components of an HVAC system such as, for example, HVAC system 4 shown in FIG. 1. The processor 114, for example, may operate in accordance with a control algorithm that provides temperature set point changes, humidity set point changes, schedule changes, air quality thresholds, start and end time changes, window frost protection setting changes, operating mode changes, ventilation changes, and/or the like. At least a portion of the control algorithm may be stored locally in the memory 122 of the HVAC controller 18 and, in some cases, may be received from an external web service over the second network 108. The control algorithm (or portion thereof) stored locally in the memory 122 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 122 may be received from an external web service over the second network 108. In some cases, the control algorithm may include settings such as set points.

In some cases, the processor 114 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 114 may be capable of operating in additional modes as necessary or desired. The number of operating modes and the operating parameter settings associated with each of the operating modes may be established locally through a user interface, and/or through an external web service and delivered to the HVAC controller via the second network 108 where they may be stored in the memory 122 for reference by the processor 114.

In some cases, the processor 114 may operate according to one or more predetermined operating parameter settings associated with a user profile for an individual user. The user profile may be stored in the memory 122 of the HVAC controller 18 and/or may be hosted by an external web service and stored on an external web server. The user profile may include one or more user-selected settings for one or more operating modes that may be designated by the user. In addition, the user profile may include one or more air quality thresholds that may be specified by the user and which, in some cases may be utilized by the processor to determine and/or anticipate the ventilation needs of the building for when the HVAC system 4 is operating in a selected operating mode. For example, the processor 114 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 114 may be programmed to include a set of rules for determining which individual user profile takes precedence for controlling the HVAC system when both user profiles are active.

In the illustrative embodiment of FIG. 4, the user interface 118, when provided, may be any suitable user interface that permits the HVAC controller 18 to display and/or solicit information, as well as accept one or more user interactions with the HVAC controller 18. For example, the user interface 118 may permit a user to locally enter data such as temperature set points, humidity set points, air quality thresholds for one or more air quality parameters, starting times, ending times, schedule times, diagnostic limits, responses to alerts, and the like. In one embodiment, the user interface 118 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 118 may be a touch screen LCD panel that functions as both display and keypad. The touch screen LCD panel may be adapted to solicit values for a number of operating parameters and/or to receive such values, but this is not required. In still other cases, the user interface 118 may be a dynamic graphical user interface.

In some instances, the user interface 118 need not be physically accessible to a user at the HVAC controller 18. Instead, the user interface 118 may be a virtual user interface that is accessible via the first network 104 and/or second network 108 using a mobile wireless device such as one of those devices 112 previously described herein. In some cases, the virtual user interface may include one or more web pages that are broadcasted over the first network 104 (e.g. LAN) by an internal web server implemented by the processor 114. When so provided, the virtual user interface may be accessed over the first network 104 using a remote wireless device 112 such as any one of those listed above. Through the one or more web pages, the processor 114 may be configured to display information relevant to the current operating status of the HVAC system 4 including the current operating mode, temperature set point, actual temperature within the building, outside temperature, outside humidity, and/or the like. Additionally, the processor 114 may be configured to display information relevant to the current indoor and/or outdoor air quality including an air quality index or alert, air pollutant concentrations, UV index, wind direction and wind speed, smog alerts, pollen forecast and/or pollen count, weather forecast data including any weather related alerts, and/or the like. In some instances, this information may be displayed to the user via a dashboard that displays multiple data and alerts in a single screen. In some cases, the dashboard maybe a user interactive dashboard that may permit a user to select a data item or alert for additional information. The processor 114 may also be configured to display or transmit one or more messages to the user regarding the ventilation needs and/or status of the building. Additionally, the processor 114 may be configured to receive and accept any user inputs entered via the virtual user interface 118 including temperature set points, humidity set points, air quality thresholds, starting times, ending times, schedule times, window frost protection settings, diagnostic limits, responses to alerts, and the like.

In other cases, the virtual user interface may include one or more web pages that are broadcasted over the second network 108 (e.g. WAN or the Internet) by an external server (e.g. web server 116). The one or more web pages forming the virtual user interface may be hosted by an external web service and associated with a user account having one or more user profiles. The external server 116 may receive and accept any user inputs entered via the virtual user interface and associate the user inputs with a user's account on the external web service. If the user inputs include any changes to the existing control algorithm including any temperature set point changes, humidity set point changes, schedule changes, air quality parameter threshold changes, start and end time changes, window frost protection setting changes, operating mode changes, and/or changes to a user's profile, the external web server may update the control algorithm, as applicable, and transmit at least a portion of the updated control algorithm over the second network 108 to the HVAC controller 18 where it is received via the second network port 106 and may be stored in the memory 122 for execution by the processor 114.

The memory 122 of the illustrative HVAC controller 18 may be in communication with the processor 114. The memory 122 may be used to store any desired information, such as the aforementioned control algorithm, set points, schedule times, air quality thresholds, and the like. The memory 122 may be any suitable type of storage device including, but not limited to, RAM, ROM, EPROM, flash memory, a hard drive, and/or the like. In some cases, the processor 114 may store information within the memory 122, and may subsequently retrieve the stored information from the memory 122.

In some instances, the processor 114 may be programmed to determine, at least in part, the ventilation needs of the building or structure 2. The ventilation needs of the building may include a current or future time period when ventilation may be desirable or beneficial. Additionally, the ventilation needs may include a current or future time period when ventilation is not required or recommended. It will be generally understood that in some cases a current time period may overlap, at least in part, with a future time period.

In some cases, the processor 114 may be programmed to determine and/or predict when window ventilation is recommended to ventilate the building to improve and/or maintain an indoor air quality of the building 2. In some cases, the processor 114 may be configured to determine and/or predict when operation of a ventilation system such as that shown in FIG. 2 and/or an economizer is desired to improve and/or maintain an indoor air quality of the building 2. The processor 114 may also be programmed to determine if a combination of window ventilation and mechanical ventilation is desirable. Additionally, the processor 114 may be configured to determine and/or predict when ventilation (window, mechanical, or a combination thereof) is no longer needed and/or recommended. The processor 114 may be programmed to determine and/or predict the ventilation needs of the building or structure 2 based on a number of different parameters indicative of indoor or outdoor air quality including, but not limited to an indoor temperature, an indoor humidity, an outdoor temperature, an outdoor humidity, a current or future weather forecast, a pollen forecast and/or pollen count, a current air pollutant concentration, an air quality index and/or air quality alert, a smog alert, one or more user-specified air quality thresholds, and/or the like. In some instances, the processor 114 may determine that ventilation is needed at a current time (e.g. now) and for some predetermined amount of time into the future extending beyond the current time. The predetermined period of time may range from about 15 minutes up to about 5 days, but not limited to this.

In some cases, the processor 114 may be programmed to determine and/or predict the ventilation needs of the building 2 based, at least in part, on a measure indicative of indoor air quality, a measure indicative of outdoor air quality, and a user-specified air quality threshold. The user-specified air quality threshold may be accepted from a user via the user interface 118 of the HVAC controller 18 and stored in the memory 122. The user-specified air quality threshold may relate to an indoor air quality parameter and/or an outdoor air quality parameter. Exemplary indoor air quality parameters may include an indoor temperature and an indoor humidity. Exemplary outdoor air quality parameters may include a current outdoor temperature and/or outdoor humidity, weather related data, pollen forecast and/or pollen count, a current air pollutant concentration, an air quality index and/or air quality alert, a smog alert, and/or the like. An air pollutant concentration may include an ozone concentration, a particulate matter concentration, a carbon monoxide concentration, a nitrogen oxides ($NO_x$) concentration, a sulfur dioxide concentration, and/or a lead concentration, but not limited to these. The weather related data may include a current or future weather forecast and/or may include severe weather alerts and other outdoor air quality risks such as, for example, a UV index, a heat index, a wind chill, wind direction and/or wind speed. Severe weather alerts may include, but are not limited to, such as for example, a thunderstorm watch or warning, a tornado watch or warning, a flash flood watch or warning, and/or the like. These are just some examples. In many cases, the user-specified air quality parameter threshold relates to an outdoor air quality parameter such as discussed herein.

The processor 114 may be programmed to solicit and accept one or more air quality thresholds from a user via the user interface 118 of the HVAC controller 18. The one or more air quality thresholds specified by the user may be based on the user's needs and/or desired comfort level. For example, an allergy suffer may specify a lower threshold for a pollen count than someone who does not suffer from pollen allergies. Similarly, someone having poor respiratory health or an elderly person may specify a lower threshold for a smog alert level or air quality index level than an average adult having a good overall health profile. In yet another example, someone who cannot tolerate high humidity may specify a lower humidity threshold. These are just some examples. In some instances, where a user has not specified any air quality thresholds, the processor 114 may be configured to rely on default values determined by the manufacturer or installer, which in some cases may be based on the needs of the average population. The default values may be stored in the memory 122 where they may be retrieved by the processor 114. The default values for one or more air quality parameters may be altered by the processor 114 upon receiving a user-specified air quality parameter threshold from a user via the user interface 118 of the HVAC controller 18.

In addition to the one or more user-specified air-quality thresholds received from a user, the processor 114 may receive one or more signals indicative of an indoor air quality and/or outdoor air quality via the input port 102 and/or network port 106. In some cases, for example, the processor 114 may receive a first signal indicative of a measure of indoor air quality from either an internal sensor such as, for example, internal temperature sensor 130 or internal humidity sensor 132 and/or a from a temperature or humidity sensor external to the HVAC controller 18, but located within the building 2 via the input port 102. Additionally, the processor 114 may receive a second signal indicative of a measure of outdoor air quality via the input put 102 and/or, the network port 106. In some cases, the second signal indicative of a measure of outdoor air quality may be received from a sensor such as, for example, a temperature or humidity sensor located outside of the building or structure 2, and may be indicative of an outdoor temperature, outdoor humidity and/or any other suitable outdoor air quality parameter.

Additionally, the processor 114 may be programmed to receive a variety of weather related data and/or air quality data via the network port 106. In some cases, the processor 114 may receive data indicative of a pollen forecast and/or a pollen count, a smog alert level, an air quality index level, an air pollutant concentration level, a dew point, a wind speed and/or wind direction, current weather conditions, a future weather forecast, any weather related alerts including a severe weather alert, wind chill advisory, heat advisory and/or the like, a UV index value, a chance percent of precipitation, and/or any other suitable weather related data via the network port 106. The various data may be received from one or more external servers 66 that host such data such as, for example, a web server hosted by the NOAA's National Weather Service, AccuWeather.com (www.accuweather.com), California's South Coast Air Quality Management District, Colorado's Air Quality Control Commission, the National Allergy Bureau, and/or a web service (such Honeywell's TOTAL CONNECT™ Web Service) that collects and aggregates the appropriate data. In some cases, regional air quality management agencies or reporting agencies may provide data indicative of smog alert levels, air quality index levels, air pollutant concentrations, and/or pollen counts. These are just some examples.

The processor 114 may utilize the weather and/or air quality data received via the network when determining and/or anticipating the current and/or future ventilation needs of the building 2. For example, in some cases, the processor 114 may receive data indicative of current weather conditions and may determine and/or anticipate the ventilation needs of the building 2 based, at least in part, on the current weather conditions in addition to a user-specified air quality threshold parameter value and measures related to an indoor air quality and an outdoor air quality. In some cases, the processor 114 may receive data indicative of a smog alert level and may determine and/or anticipate the ventilation needs of the building 2 based, at least part, on the smog alert level. In yet another example, the processor 114 may receive data indicative of a current pollen count and may determine and/or anticipate the ventilations needs of the building 2 based, at least in part, on the current pollen count. In still yet another example, the processor 114 may receive indicative of one or more air pollutant concentrations and may determine and/or anticipate the ventilation needs of the building 2 based, at least in part, on the air pollutant concentrations. These are just some examples. It will be generally understood that the processor 114 may be programmed to determine and/or anticipate the ventilation needs of the building 2 based on a combination of a number of different parameters including, but not limited to one or more measures related to an indoor air quality and/or an outdoor air quality, one or more user specified air quality thresholds, and weather and/or air quality related data.

In some cases, the processor 114 may be programmed to compare the weather and/or air quality data received via the network port 106 to air quality thresholds, including any user-specified air quality thresholds, that are stored in the in memory 122 and, based at least in part on the comparison, determine and/or anticipate the current and/or future ventilation needs of the building 2. For example, if the processor 114 determines that an air quality index value is lower than a user-specified threshold for an air quality index, then the processor 114 may determine that ventilating with fresh air from the outside is recommended or desired. Ventilation of the building may be accomplished by opening one or more windows 5 in the building 2 and/or by operating a ventilation system which draws in fresh air from outside the building 2 as shown and described in reference to FIG. 2. In some cases, ventilation of the building may be accomplished by automatically opening one or more power operated windows 5 in the building 2. In other cases, the processor 114 may display a message to the user via the user interface 118 of the HVAC controller recommending that the user manually open one or more windows 5 in the building 2 for ventilation. In still other cases, the processor 114 may transmit a message to the user via SMS text message or email recommending that the user manually open one or more windows 5 in the building 2 for ventilation. Similarly, when the processor 114 determines that ventilation is no longer necessary or recommended, the processor may display or transmit a message to the user recommending that the user close any open windows 5 or cease operation of any ventilation equipment. In other cases, when the processor 114 determines that ventilation is no longer necessary or recommended, the processor may display or transmit a message notifying the user that ventilation is no longer necessary and/or recommended and may automatically close one or more windows and/or cease operation of a ventilation system associated with the building 2. Additionally, in some cases, the processor 114 may cause the HVAC controller 18 to control one or more HVAC controller to regulate the environmental conditions within the building according to an operating schedule previously stored in the memory of the HVAC controller 18.

Additionally, in some instances, the processor 114 may be configured to prioritize a user-specified air quality parameter threshold over measures related to an indoor air quality and an outdoor air quality when determining the ventilation needs of the building 2. For example, if the outdoor temperature is lower than an indoor temperature, it would be generally expected that the processor 114 may determine that window ventilation is recommended. However, if a pollen count is higher than a user-specified threshold parameter value for the pollen count then, based on the higher priority assigned to the user specified threshold parameter which, in this case, is a pollen count, the processor 114 may determine that window or other ventilation is not recommended. This is just one example. In some cases, the processor 114 may be configured to solicit and accept user-determined priority for a number of different parameters including, but not limited to, one or more measures related to an indoor air quality and/or an outdoor air quality, one or more user specified air quality thresholds, and/or a variety of weather and/or air quality related data.

In some instances, when determining and/or anticipating the ventilation needs of the building, the processor 114 may be programmed to assign a user-determined priority or weight to a number of different parameters related to an indoor air quality and/or an outdoor air quality. The processor 114 may use the weighted indoor air quality parameter values and/or outdoor air quality parameter values when determining the indoor air quality and the outdoor air quality and/or when comparing the indoor air quality to the outdoor air quality when determining the ventilation needs of the building 2.

Equation 1 is an exemplary equation that may be used by the processor 114 when determining an outdoor air quality. Each of the parameters used to determine an outdoor air quality value may be assigned a weight based, at least in part, on a user-determined priority for each of the different parameters. The outdoor air quality value may be at least a function of the sum of each of the different parameter values and in some cases, may be an average value. A normalization factor could also be used.

$$\text{Outdoor Air Quality} = w_t \text{ Outdoor Air Temp} + w_{hum} \text{ Outdoor Humidity} + w_p \text{ Pollen Count} + w_{AQI} \text{ Air Quality Index} \quad \text{Eq. 1}$$

Equation 2 is an exemplary equation that may be used by the processor 114 when determining an outdoor air quality. Each of the parameters used to determine an outdoor air quality value may be assigned a weight based, at least in part, on a user-determined priority for each of the different parameters. The outdoor air quality value may be at least a function of the sum of each of the different parameter values and in some cases, may be an average value. A normalization factor could also be used.

$$\text{Indoor Air Quality} = w_t \text{ Indoor Air Temp} + w_{hum} \text{ Indoor Humidity} + w_{co2} CO_2 + w_{CO} CO \quad \text{Eq. 2}$$

In some cases, the processor 114 may be programmed to ventilate the building or recommend ventilation of the building when the processor 114 determines that the outdoor air quality is greater than the indoor air quality. Under certain circumstances, ventilating the building 2 maybe less energy efficient than continuing to operate the HVAC system 4 according to its current program. In some instances, the processor 114 may be configured to prompt the user to enter their preference as to ventilating the building using outside air to maintain or improve the indoor air quality, even when it is less energy efficient to do so. In other words, the processor 114 may present an option to the user via the user interface 118 for the user to override a more energy efficient operation of the HVAC system 4 in favor of increasing the indoor air quality of the building 2. In many cases, the override of a more energy efficient operation configuration in favor of maintaining or increasing the indoor air quality is temporary.

The processor 114 may also be programmed to determine an amount of time in which ventilation is needed and/or recommend based on one or more user-specified air quality parameter thresholds and/or any weather related or air quality data, as described herein. The amount of time determined for ventilation may be based, at least in part, on one or more user-specified air quality thresholds and any weather and/or air quality data received via the network port 106. In some cases, the processor 114 may also be configured to predict when ventilation is recommended based, at least in part, on any weather and/or air quality data received via the network port 106.

Upon determining the ventilation needs of the building 2, the processor 114 may be configured to automatically transmit one or more command signals to an IAQ component or other HVAC component 6 via the input/output block 128 to ventilate the building 2. The building 2 may be ventilated by opening one more powered windows and/or operation of mechanical ventilation system. In other instances, upon determining the ventilation needs of the building 2, the processor 114 may be configured to notify the user that ventilation is recommended and/or needed. In some cases, the processor 114 may be configured to notify that the user that the building 2 is currently being ventilation and may provide an amount of time for ventilation. For example, the processor 114 may be configured to transmit a data package to a user via the input port 102 and/or network port 106. The data package transmitted to the user may be in the form of a SMS text message or an email, and may notify the user to operate an IAQ component or that window ventilation is recommended. Alternatively, or in addition, the processor 114 may be configured to display a message or alert to the user via the user interface 118 of the HVAC controller 18 indicating the need for ventilation. The message may instruct the user to operate any IAQ components such as, for example, a mechanical ventilation system and/or economizer or, in some cases, may indicate that window ventilation is recommended. In other instances, the message may notify the user that the HVAC controller 18 is commencing operation of any ventilation equipment and/or opening any power operated windows 5 located within the building 2. Additionally, the message may indicate the length of time desired or needed for adequate ventilation and/or may include a prediction as to when conditions for ventilation may be favorable.

In still other instances, the processor 114 may be programmed to follow one or more pre-set or customized programs for ventilating the building 2. The pre-set or customized programs may be utilized ventilate the building 2 under selected conditions, and may be selected by the user through the user interface 118 of the HVAC controller 18. For example, a first pre-set or custom program may be selected by a user when a building occupant is ill, and may cause the processor 114 to control transmit one or more command signals to an IAQ component or other HVAC component 6 to increase ventilation and humidity and, in some cases, maintain an elevated temperature overnight. Another pre-set or customized program may be selected by a user when the building is occupied above typical levels (e.g., when the occupants are hosting a gathering), and may cause the processor 114 transmit one or more command signals to an IAQ component or other HVAC component 6 to increase ventilation, lower indoor humidity and, in some cases, lower the temperature within the building. Still another pre-set or customized program may be selected by a user for operating the HVAC components 6, including any IAQ components during allergy season when pollen count levels are expected to be elevated, and may cause the processor 114 to transmit one or more command signals to an IAQ component or other HVAC component 6 to minimize outdoor ventilation and increase the blower speed within the building 2 when the pollen count has reached a pre-determined level. These are just some examples.

Referring back to FIG. 3, in some instances, the HVAC controller 18 may be programmed to communicate over the network 108 with an external web service hosted by one or more external servers 116. A non-limiting example of such an external web service is Honeywell's TOTAL CONNECT™ web service. In some cases, as will be discussed in greater detail below, the server 116 may be configured to determine the ventilation needs of the building in which the HVAC controller 18 is located based, at least in part, on data received from one or more sensors indicative of the environmental conditions inside of the building, outside of the building, and/or weather related data including air quality data sometimes received from another web server such as a National Weather Service web server which may also be in communication with the server 116 and/or HVAC controller 18. In some cases, the server 116 may also be configured to receive one or more user specified air quality thresholds that may provided by the user via the user interface 118 of the HVAC controller 18 and/or via one or more remote devices 112. The one or more user specified air quality thresholds may also be used by the server 116 when determining the ventilation needs of the building 2. As discussed herein, the user interface 118 may be located at the HVAC controller 18 or provided at a remote device 112. In some cases, the server 116 may serve up on or more web pages forming the user interface 118 for the HVC controller 18 that may be accessible to a user over a network such as, for example, network 108 when using a remote device such as any of those devices 112 discussed herein or that may be displayed on the display of the HVAC controller 18.

Figure 5:
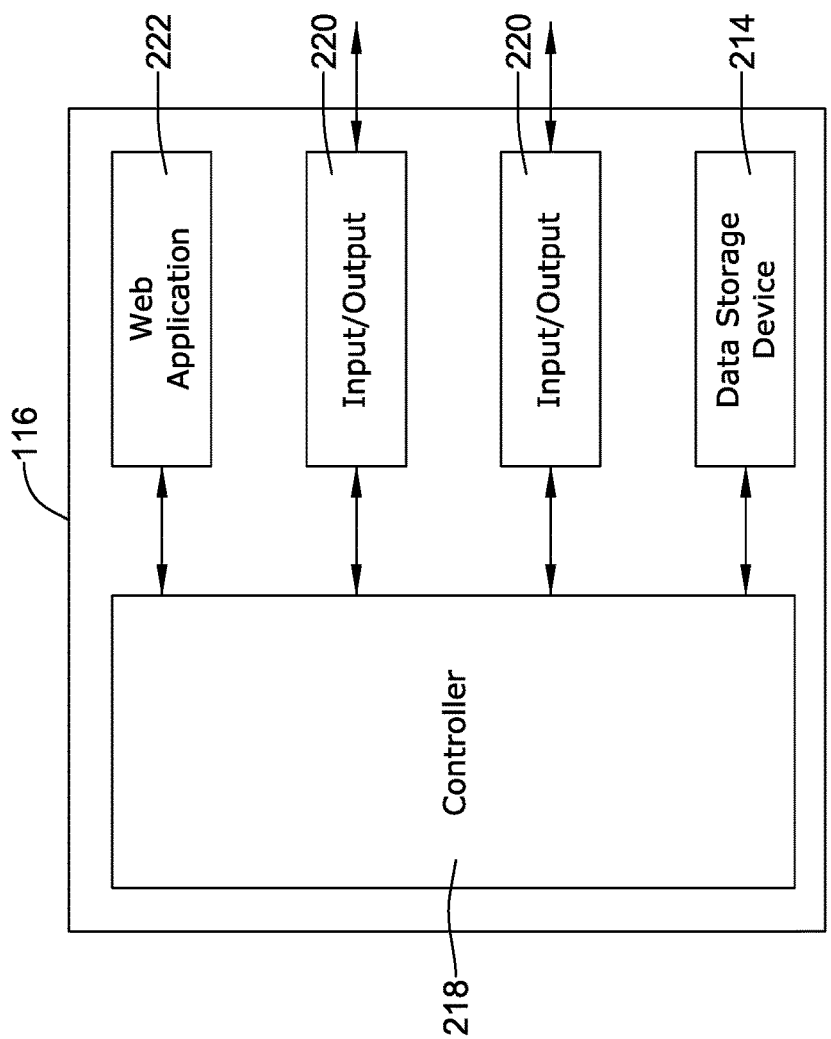
FIG. 5 is a schematic block diagram of an illustrative web server.

FIG. 5 is a schematic view of an external server 116 for hosting an external web service as discussed herein. As discussed above with reference to FIG. 3, the external server 116 may be in communication with the HVAC controller 18 over a network 108 such as, for example, the Internet. As shown in FIG. 5, the external server 116 can include at least one input/output port 220 for sending and/or receiving data over the network 108 to and from the HVAC controller 18 and/or another remote device 112. Additionally, the external server 116 may send and/or receive data to and from another web server over the network 108 via the input/output port 220. The external server 116 can also include a data storage device 214, and a controller 218 coupled to the input output port 220 and the data storage device 214. In some cases, the controller 218 may be configured to implement a web application 222 for serving up one or more web pages over the network 108 via the input/output port 220. The one or more web pages may be accessed and viewed by a user using a remote device such as, for example, any one of the remote devices 112 described herein or at the HVAC controller 18. In some cases, the one or more web pages may provide a virtual user interface 118 for interacting with the HVAC controller 18. Through the one or more web pages forming the virtual user interface 118, a user may respond to alerts and may enter or change various HVAC operating parameters including, but not limited, to temperature set points, humidity set points, starting times, ending times, schedule times, diagnostic limits, and/or the like, as well as respond to one or more alerts. Additionally, through the one or more web pages, a user may provide one or more air quality thresholds as discussed herein. In some cases, rather than providing one or more web pages, an application (app) may be downloaded to a remote device 112. The application may connect to the external server 116 and provide the virtual user interface 118 on the remote device.

In some instances, the controller 218 may be programmed to determine and/or anticipate the current and/or future ventilation needs of the building or structure 2 in which the HVAC controller 18 is connected. For example, in some cases, the controller 218 may be programmed to determine and/or anticipate when window ventilation is recommended to ventilate the building to improve and/or maintain an indoor air quality of the building 2. In other cases, the controller 218 may be configured to determine and/or anticipate when operation of a ventilation system such as that shown in FIG. 2 and/or an economizer is necessary to improve and/or maintain an indoor air quality of the building 2. In some cases, the controller 218 may receive data related to the indoor and/or outdoor air quality from the HVAC controller 18. In some cases, the controller 218 may be programmed to determine if a combination of window ventilation and mechanical ventilation is desired. Additionally, the processor 114 may be configured to determine and/or anticipate when ventilation is no longer needed and/or recommended. The controller 218 may be programmed to determine and/or anticipate the ventilation needs of the building or structure 2 based on a number of different parameters indicative of indoor or outdoor air quality including, but not limited to an indoor temperature, an indoor humidity, an outdoor temperature, an outdoor humidity, a pollen forecast and/or a pollen count, a smog alert level, an air quality index level, a dew point, a wind speed and/or wind direction, current weather conditions, a future weather forecast, a chance percent of precipitation, a user-specified air quality parameter threshold value, and/or the like.

In some cases, the controller 218 may be programmed to determine the ventilation needs of the building 2 based, at least in part, on a measure indicative of indoor air quality, a measure indicative of outdoor air quality, and one or more user-specified air quality thresholds. The user-specified air quality threshold(s) may be accepted from user via the user interface 118 of the HVAC controller 18 and stored in the memory 122. In some instances, as discussed herein, the user interface 118 may be provided by one or more web pages served up by the server 116 over a network 108, which may be accessed at the HVAC controller 18 or by using a remote device 112. In some cases, the HVAC controller 18 and/or remote device 112 may execute an application (app) that provides the user interface.

The user-specified air quality threshold may relate to an indoor air quality parameter and/or an outdoor air quality parameter. Exemplary indoor air quality parameters may include an indoor temperature and an indoor humidity. Exemplary outdoor air quality parameters may include a current outdoor temperature and/or outdoor humidity, weather related data, pollen forecast and/or pollen count, a current air pollutant concentration, an air quality index and/or air quality alert, a smog alert, and/or the like. An air pollutant concentration may include an ozone concentration, a particulate matter concentration, a carbon monoxide concentration, a nitrogen oxides ($NO_x$) concentration, a sulfur dioxide concentration, and/or a lead concentration, but not limited to these. The weather related data may include a current weather forecast and/or may include severe weather alerts and other outdoor air quality risks such as, for example, a UV index, a heat index, a wind chill, wind direction and/or wind speed. Severe weather alerts may include, but are not limited to, such as for example, a thunderstorm watch or warning, a tornado watch or warning, a flash flood watch or warning, and/or the like. These are just some examples. In many cases, the user-specified air quality parameter threshold relates to an outdoor air quality parameter such as discussed herein.

The controller 218 of the server 116 may be programmed to solicit and accept one or more air quality parameter threshold(s) from a user via the user interface 118 of the HVAC controller 18 and/or via a virtual user interface on a remote device 112. The one or more air quality parameter threshold(s) specified by the user may be based on the user's needs and/or desired comfort level. For example, an allergy suffer may specify a lower threshold value for a pollen count than someone who does not suffer from allergies. Similarly, someone having poor respiratory health or an elderly person may specify a lower threshold value for a smog alert level or air quality index level than the average adult having a good overall health profile. In yet another example, someone who cannot tolerate high humidity may specify a lower threshold value for indoor humidity. These are just some examples. In some instances, where a user has not specified any air quality parameter threshold, the controller 218 may be configured to rely on default values determined by the manufacturer or the installer for a variety of air quality parameters. These default values may be stored in the data storage device 214 where they may be retrieved by the controller 218. The default values for one or more air quality thresholds may be altered by the controller 218 upon receiving a user-specified air quality parameter threshold from a user via the user interface 118 of the HVAC controller 18 or via a virtual user interface.

The controller 218 may receive one or more signals indicative of an indoor air quality and/or outdoor air quality transmitted over the network 108 via the input/output port 220. In some cases, the one or more signals indicative of an indoor air quality and/or outdoor air quality may be transmitted by the HVAC controller 18 to the server 116 where they may be received by the controller 218 via the input/output port 220. In other cases, the one or more signals indicative of an indoor air quality and/or outdoor air quality may be transmitted by one or more network enabled sensors (e.g. sensors) which may be capable of transmitting and/or receiving signals indicative of indoor and/or outdoor environmental conditions over a network such as, for example, network 108 where they may be received by the controller 218 via the input/output port. In some cases, the signals may be incorporated into a data transmission package which may contain additional data, but this is not required.

In some cases, the controller 218 may be programmed to receive a variety of weather related data and/or air quality data via an additional input/output port 220. In some cases, the controller 218 may receive data indicative of a pollen forecast and/or a pollen count, a smog alert level, an air quality index level, an air pollutant concentration level, a dew point, a wind speed and/or wind direction, current weather conditions, a future weather forecast, any weather related alerts including a severe weather alert, wind chill advisory, heat advisory, and/or the like, a UV index value, a chance percent of precipitation, and/or any other suitable weather related from another web server via the input/output port 220. The various data may be received from one or more external servers 66 that host such data such as, for example, a web server hosted by the NOAA's National Weather Service, AccuWeather.com (www.accuweather.com), California's South Coast Air Quality Management District, Colorado's Air Quality Control Commission, the National Allergy Bureau, and/or a web service (such Honeywell's TOTAL CONNECT™ Web Service) that collects and aggregates the appropriate data. In some cases, regional air quality management agencies or reporting agencies may provide data indicative of smog alert levels, air quality index levels, air pollutant concentrations, and/or pollen counts. These are just some examples.

It is contemplated that the controller 218 may utilize any weather and/or air quality data received via the network when determining the ventilation needs of the building. For example, in some cases, the controller 218 may receive data indicative of current weather conditions and may determine the ventilation needs of the building 2 based, at least in part, on the current weather conditions in addition to a user-specified air quality threshold parameter value and measures related to an indoor air quality value received from the HVAC controller 18. Similarly, the controller 218 may receive data indicative of a smog alert level and may determine and/or predict the ventilation needs of the building 2 based, at least part, on the smog alert level in addition to a user-specified air quality threshold. In yet another example, the controller 218 may receive data indicative of a current pollen count and may determine and/or predict the ventilations needs of the building 2 based, at least in part, on the current pollen count in addition to a user-specified air quality threshold. In still yet another example, the controller 218 may receive indicative of one or more air pollutant concentrations and may determine and/or predict the ventilation needs of the building 2 based, at least in part, on the air pollutant concentrations. These are just some examples. In some instances, the controller 218 may be programmed to determine and/or anticipate the ventilation needs of the building 2 based on a combination of two or more different parameters including, but not limited to one or more measures related to an indoor air quality, one or more measures related to an outdoor air quality, and/or one or more user specified air quality thresholds.

In some cases, the controller 218 may be programmed to compare the weather and/or air quality data received via the input/output port 220 to the air quality thresholds, including any user-specified air quality thresholds stored in the in memory 122 and, based at least in part on the comparison, determine the ventilation needs of the building 2. In one example, if the controller 218 determines that an air quality index value is lower than a user-specified threshold for an air quality index, then the controller 218 may determine that ventilating with fresh air from the outside of the building is desirable or recommended. Ventilation of the building may be accomplished by, for example, opening one or more windows of the building and/or by operating a ventilation system which draws in fresh air from outside the building as shown and described in reference to FIG. 2. In some cases, ventilation of the building may be accomplished by automatically opening one or more power operated windows 5 in the building 2. In other cases, the controller 218 may display a message to the user via the user interface 118 of the HVAC controller recommending that the use manually open one or more windows 5 in the building 2 for ventilation. In still other cases, the controller 218 may transmit a message to the user via SMS text message or email recommending that the user manually open one or more windows 5 in the building 2 for ventilation. Similarly, when the controller 218 determines that ventilation is no longer necessary or recommended, the processor may display or transmit a message to the user recommending that the user close any open windows 5 or cease operation of any ventilation equipment. In other cases, when the controller 218 determines that ventilation is no longer necessary or recommended, the controller 218 may display or transmit a message notifying the user that ventilation is no longer necessary and/or recommended and may automatically close one or more windows and/or cease operation of a ventilation system associated with the building 2. Additionally, in some cases, the controller 218 may cause the HVAC controller 18 to control one or more HVAC controller to regulate the environmental conditions within the building 2 according to an operating schedule previously stored on the server.

In some instances, the controller 218 may be configured to prioritize user-specified air quality thresholds when determining the ventilation needs of the building. For example, if the outdoor temperature is lower than an indoor temperature, it would be generally expected that the controller 218 may determine that window (or other) ventilation is recommended. However, if a pollen count is higher than a user-specified parameter threshold for the pollen count, then based on the higher priority assigned to the user specified parameter threshold of pollen count (in this example), the controller 218 may determine that window (or other) ventilation is not recommended. This is just one example. In some cases, the controller 218 may be configured to display one or more web pages that are configured to solicit and/or accept a user-determined priority for two or more different parameters including, but not limited to, one or more measures related to an indoor air quality and/or an outdoor air quality.

In some instances, when determining the ventilation needs of the building, the controller 218 may be programmed to assign a user-determined priority or weight to a number of different parameters related to an indoor air quality and/or an outdoor air quality. The processor 114 may use the weighted indoor air quality parameter values and/or outdoor air quality parameter values when determining the indoor air quality and the outdoor air quality and/or when comparing the indoor air quality to the outdoor air quality when determining the ventilation needs of the building 2. The controller 218 may be configured to utilize Equations 1 and 2 when determining the ventilation needs of the building 2, as described herein.

In some cases, the controller 218 may be programmed to ventilate the building or recommend ventilation of the building when the controller 218 determines that the outdoor air quality is greater than the indoor air quality. Under certain circumstances, ventilating the building 2 maybe less energy efficient than continuing to operate the HVAC system 4 according to its current program. In some instances, the controller 218 may be configured to display one or more web pages that are configured to prompt the user to enter their preference as to ventilating the building using outside air to maintain or improve the indoor air quality, even when it is less energy efficient to do so. In other words, the controller 218 may display an option to the user via the one or more web pages forming the user interface 118 for the user to override a more energy efficient operation of the HVAC system 4 in favor of increasing the indoor air quality of the building 2. In many cases, the override of a more energy efficient operation configuration in favor of maintaining or increasing the indoor air quality is temporary.

The controller 218 may also be programmed to determine an amount of time in which ventilation is needed and/or recommend based on one or more user-specified air quality parameter thresholds and/or any weather related or air quality data, as described herein. The amount of time determined for ventilation may be based, at least in part, on one or more user-specified air quality thresholds and any weather and/or air quality data received via the input/output port 220. In some cases, the controller 218 may also be configured to predict when ventilation is recommended based, at least in part, on any weather and/or air quality data received via the input/output port 220.

In some instances, upon determining the ventilation needs of the building 2, the controller 218 may transmit a data package to the HVAC controller 18 via the input/output port 220, including a command to operate an IAQ component or other HVAC component 6 of the HVAC system 4 of the building 2. The building 2 may be ventilated by opening one more powered windows and/or operation of mechanical ventilation system. In other instances, upon determining the ventilation needs of the building 2, the controller 218 may notify the user of the building that ventilation is recommended and/or needed and may specify an amount of time needed or recommended for adequate ventilation. Additionally, the controller 218 may notify the user that the building is currently being ventilated. For example, the controller 218 may be configured to transmit a data package to a user via the input/output port 220. The data package may be in the form of a SMS text message or an email, and may instruct the user to operate an IAQ component or indicate that window ventilation is recommended. In other cases, the controller 218 may be configured to display a message or alert on the user interface 118 of the HVAC controller 18 indicating the desirability of ventilation. As discussed herein, the user interface 118 may be located at the HVAC controller 18 and/or provided at a remote device 112 such as any of those remote devices described herein. The message may instruct the user to operate any IAQ components such as, for example, a mechanical ventilation system and/or economizer or, in some cases, may indicate that window ventilation is recommended. In other instances, the message may notify the user that the HVAC controller 18 is commencing operation of any ventilation equipment and/or opening any power operated windows 5 located within the building 2. Additionally, the message may indicate the length of time desired or needed for adequate ventilation and/or may include a prediction as to when conditions for ventilation may be favorable.

In still other instances, the controller 218 may be programmed to follow one or more pre-set or customized programs for ventilating the building 2. The pre-set or customized programs may be utilized ventilate the building 2 under selected conditions, and may be selected by the user through the user interface 118 of the HVAC controller 18. For example, a first pre-set or custom program may be selected by a user when a building occupant is ill, and may cause the controller 218 to control transmit one or more command signals via the input/output port 220 to an IAQ component or other HVAC component 6 to increase ventilation and humidity and, in some cases, maintain an elevated temperature overnight. Another pre-set or customized program may be selected by a user when the building is occupied above typical levels (e.g., when the occupants are hosting a gathering), and may cause the controller 218 transmit one or more command signals via the input/output port 220 to an IAQ component or other HVAC component 6 to increase ventilation, lower indoor humidity and, in some cases, lower the temperature within the building. Still another pre-set or customized program may be selected by a user for operating the HVAC components 6, including any IAQ components during allergy season when pollen count levels are expected to be elevated, and may cause the controller 218 to transmit one or more command signals via the input/output port 220 to an IAQ component or other HVAC component 6 to minimize outdoor ventilation and increase the blower speed within the building 2 when the pollen count has reached a pre-determined level. These are just some examples.

Figure 6:
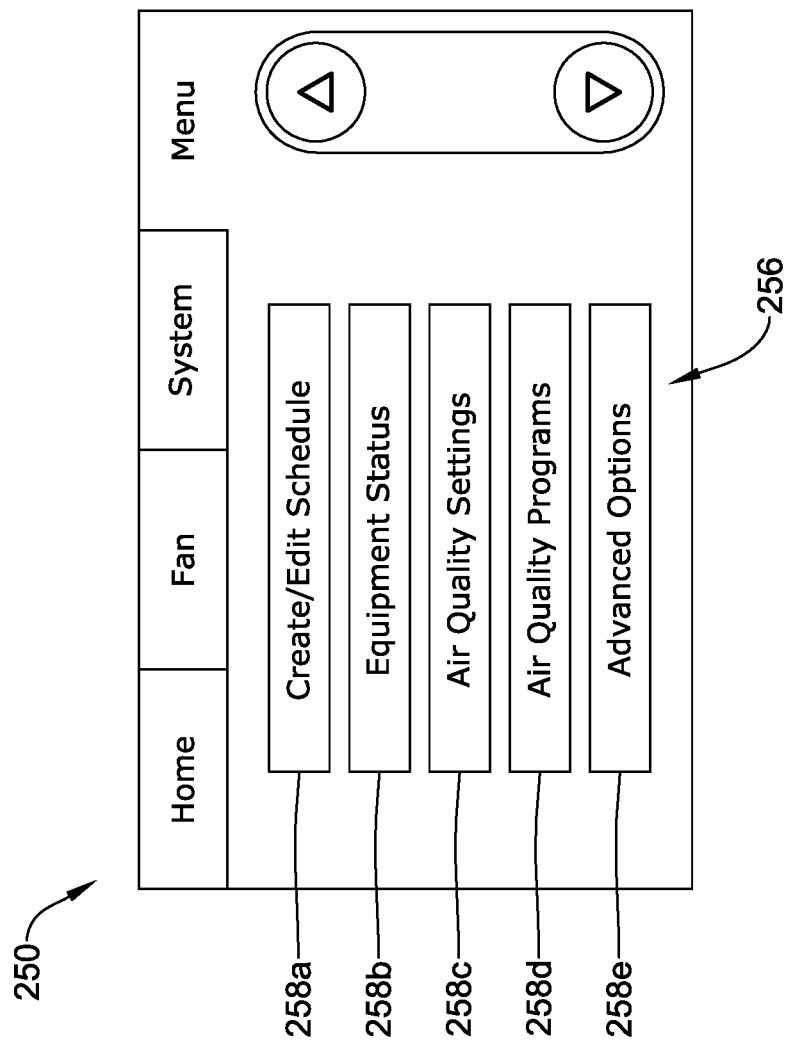
Figure 7:
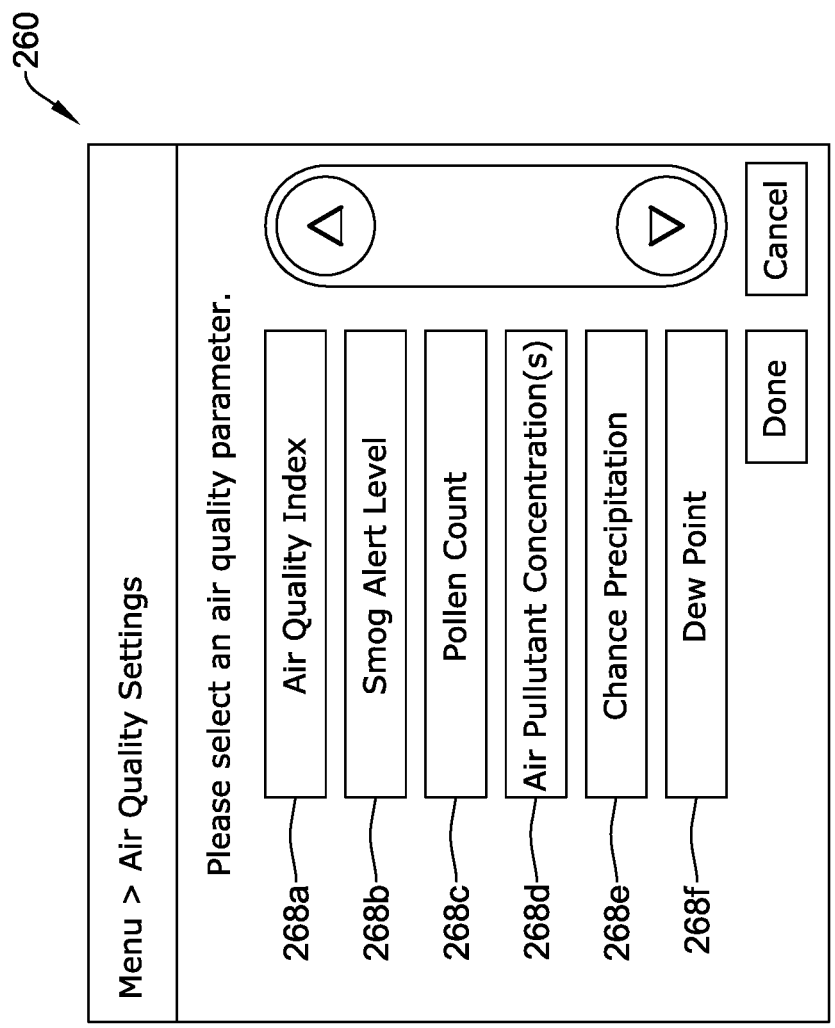

FIGS. 6-7 show exemplary screens 250, 260 that may be displayed by the HVAC controller 18 and/or server 116 via a user interface (e.g. user interface 118), and that may be used to solicit and/or accept one or more air quality thresholds from a user. In some cases, screen 260 of FIG. 7 may be accessed through a menu screen such as, for example, menu screen 250 shown in FIG. 6. Menu screen 250 may include a table or a drop down menu 256 that includes one or more menu options 258a-258e that may be selected by a user. As can be seen in FIG. 6, the menu options can include an "Air Quality Settings" option 258c. In some cases, the "Air Quality Settings" menu option 258c may be available under an advanced setting menu option such as for example, menu option 258e, but this is not required.

In the example shown, selection of the "Air Quality Settings" menu option 258c may cause the processor 114 or controller 218 to display at least one additional screen 260, shown in FIG. 7, which may prompt select a user to select an air quality parameter from a menu including one or more selectable options 268a-268f, where each selectable option 268a-268f corresponds to a different air quality parameter. In some cases, the one or more selectable options 268a-268f may be displayed in a table or in a drop down menu as shown, although this is not required. As shown in FIG. 7, selectable options 268a-268f may correspond to an air quality index, a smog alert level, a pollen count, air pollutant concentration(s), a chance of precipitation, and a dew point, respectively. It will be generally understood that selectable options 268a-268f may correspond to other air quality parameters depending upon the application and/or the needs of the consumer (e.g. humidity, etc.).

Figure 8:
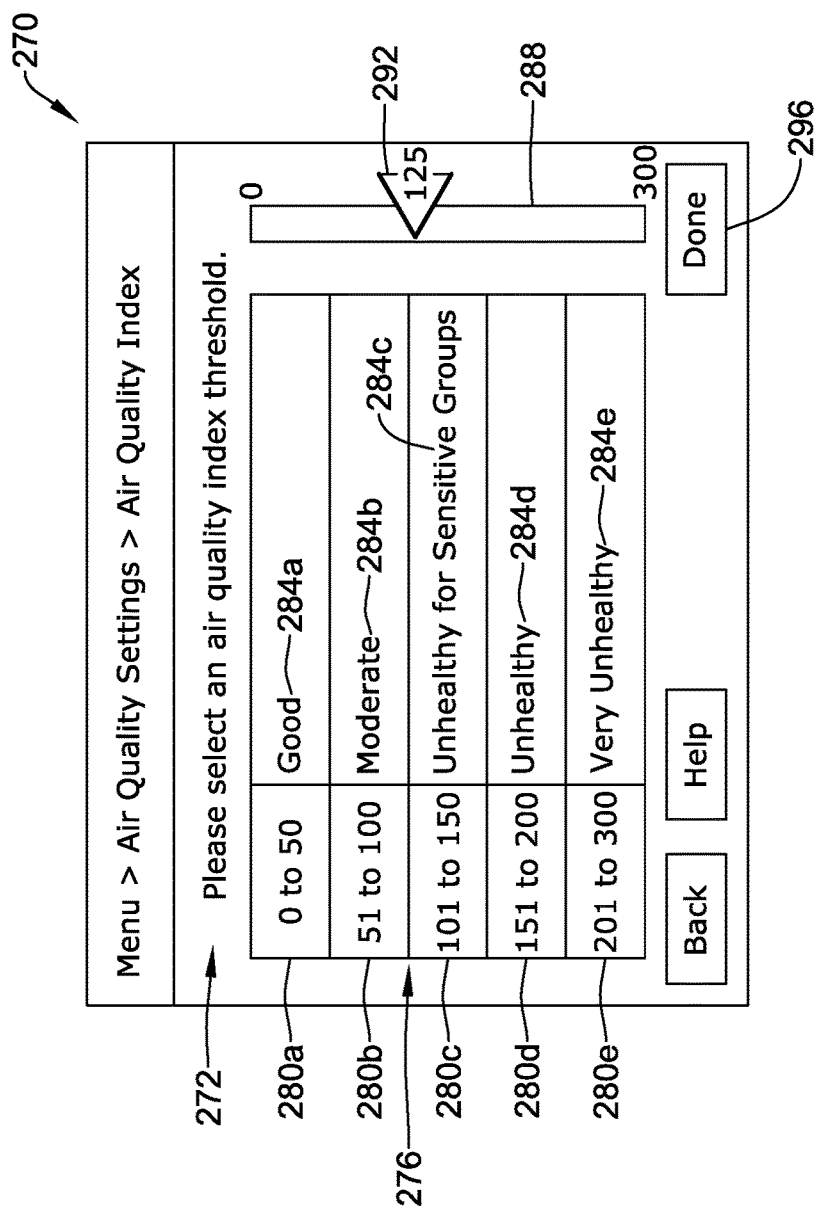

In one illustrative example, selection of the "Air Quality Index" option 268a may cause the processor 114 or controller 218 to display screen 270, as shown in FIG. 8, which may include a user prompt 272 that instructs the user to select an air quality threshold value. Screen 270 may display a table 276 including a list of air quality index values and/or range of index values 280a-280e. The table 276 also include a descriptor 284a-284e associated with each index value or range of index values 280a-280e. The air quality index values or range of index values 280a-280e and their related descriptors 284a-284e may vary by country or region if desired. In some cases, the air quality index values or range of index values 280a-280e and their related descriptors 284a-284e may be color coded, but this is not required. In the example shown, the air quality index values or range of index values 280a-280e include quantitative values, and their related descriptors 284a-284e include qualitative descriptions. The qualitative descriptions 284a-284e may aid a user in making a proper selection.

In some cases, screen 270 may include a slider bar 288 including an indicator 292 that may interact with the index values 280a-280e listed in table 276. The user may use the indicator 292 slider bar 288 to select an air quality threshold value. In some cases, as the user manipulates the slider bar 288, the indicator 292 may indicate the actual air quality index value. In other cases, a user may simply select the desired air quality index value or range of values from the list of such values displayed by table 276. Upon selecting the desired air quality index values or range of index values, the user may select the done button 296. Selection of the done button 296 may cause the processor 114 or controller 218 to store the air quality index threshold value in the memory 122 or 214. Additionally, selection of the done button 296 may cause the processor 114 or controller 218 to return to the previous screen 260 from which the user may select another air quality parameter for inputting another user-specified air quality parameter threshold, as desired.

Figure 9:
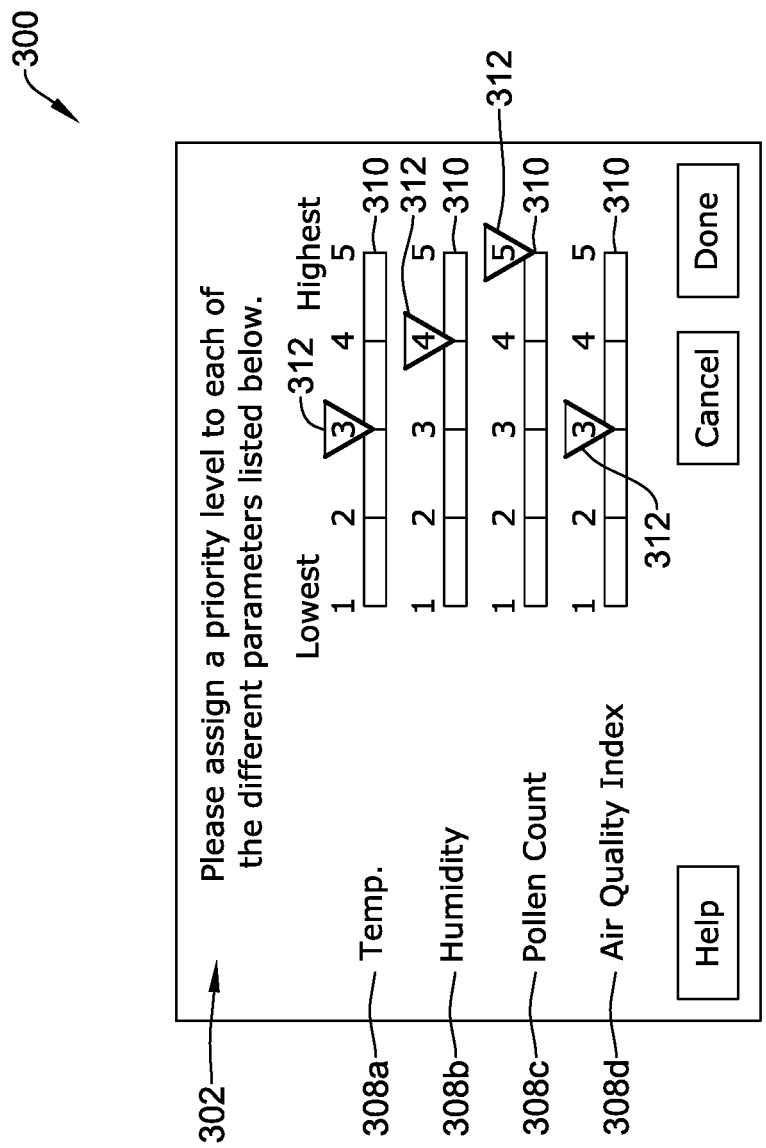
Figure 10:
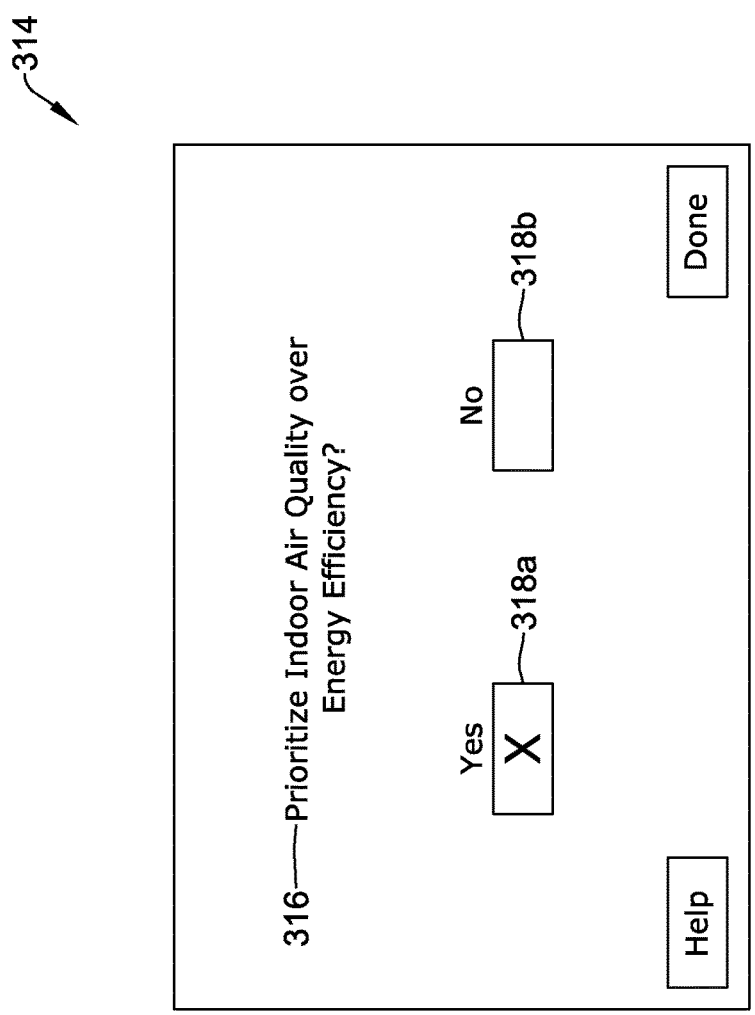

In some cases, after a user has provided one or more air quality threshold values, the processor 114 or controller 218 may display at least one additional screen 300, as shown in FIG. 9, that may prompt a user to assign a ranking or prioritize one or more air quality parameters. Screen 300 may include a natural language prompt 302 that may prompt the user to assign a ranking or priority level on using a ranking scale 304 that may be displayed on screen 300. The ranking scale 304 displayed on screen 300 may be a star ranking scale, a ranking scale of 1 to 10, or a ranking scale of 1 to 5 (shown). These are just some examples. Other ranking scales may be utilized. In addition, ranking scale 304 may include qualitative labels 306a, 306b indicating the high and low ends of the scales. As shown in FIG. 9, a ranking scale 304 may be displayed for each different air quality parameter 308a-308d identified on screen 300. It will be generally understood that the number and/or type of air quality parameters for which a ranking scale 304 is displayed may differ depending on the desired application and/or needs of the consumer. In some cases, as shown, each of the ranking scales may include a slider bar 310 and a slider control 312 that may be manipulated by a user to assign a ranking to each of the different air quality parameters. This is just one example. Other selection features, such as radio buttons, may be displayed and utilized by the user to assign a ranking or priority to one or more air quality parameters. In some cases, instead of soliciting specific air quality threshold values as described above in reference to FIGS. 7 and 8, the processor 114 or controller 218 may programmed to only prompt a user to rank or prioritize a number of different air quality parameters.

Additionally, in some cases, after a user has provided one or more air quality threshold value, the processor 114 or the controller 218 may be configured to display yet another screen 314 that may prompt a user to indicate their preference for prioritizing indoor air quality over energy efficiency. This may be applicable when the processor 114 or controller 218 determines that the outdoor air quality is greater than the indoor air quality, but energy efficiency of the building 2 may be compromised or decreased if ventilation is commenced. Screen 314 may display a user prompt 316 that may query a user about their preference. Screen 314 may include a first checkbox 318a labeled "Yes" and a second checkbox 318b labeled "No" that a user may user to indicate their preference. Upon receiving and accepting the user's indicated preference, the processor 114 and the controller 218 may be configured to store the user's preference in a memory.

Figure 11:
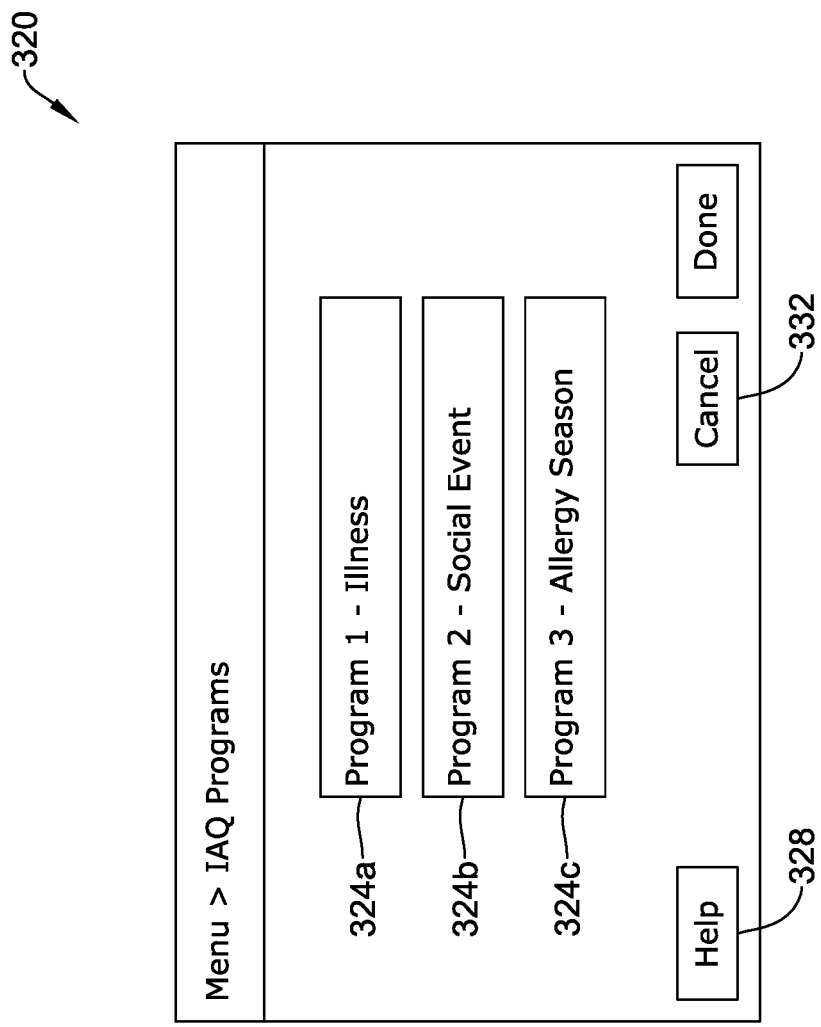

FIG. 11 shows another exemplary screen 320 that may be displayed by the HVAC controller 18 and/or server 116 via a user interface (e.g. user interface 118). Screen 320 may be displayed upon selection of the "IAQ Programs" selection option 258d displayed on menu screen 250 shown in FIG. 6. As can be seen in FIG. 9, screen 320 includes one or more selectable IAQ program options 324a-324c that may be selected by a user. Each of the selectable IAQ program options 324a-324c correspond to a pre-set or customized IAQ program that may be executed by the processor 114 or, in some cases, the controller 218 for operating one or more IAQ components or other HVAC components 6 for managing the indoor air quality of the building 2 under selected conditions. In some instances, each of the selectable IAQ program options 324a-324c include a descriptor which may aid a user in selecting the most appropriate program for the user's selected conditions. In addition, screen 320 may also include a button labeled "Help" that when selected may cause the processor 114 or controller 218 to display additional information about each of the selectable options 324a-324c. Upon selecting the desired IAQ program options 324a, 324b or 324c, the user may select the done button 332. Selection of the done button 332 may cause the processor 114 or controller 218 to execute the selected IAQ program. Additionally, selection of the done button 332 may cause the processor 114 or controller 218 to return to a previous screen (e.g. menu screen 250) from which the user may select another option, as desired.

Figure 12:
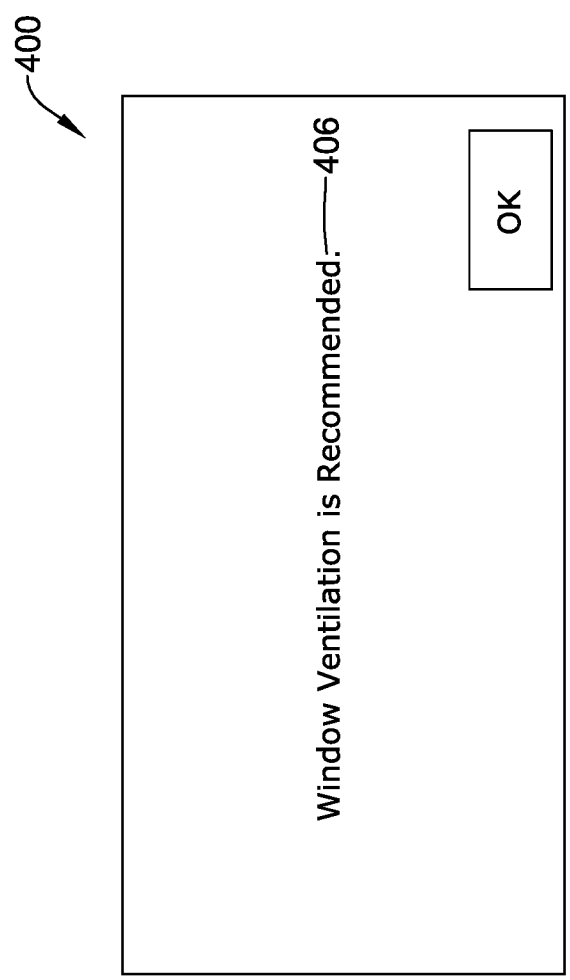
Figure 13:
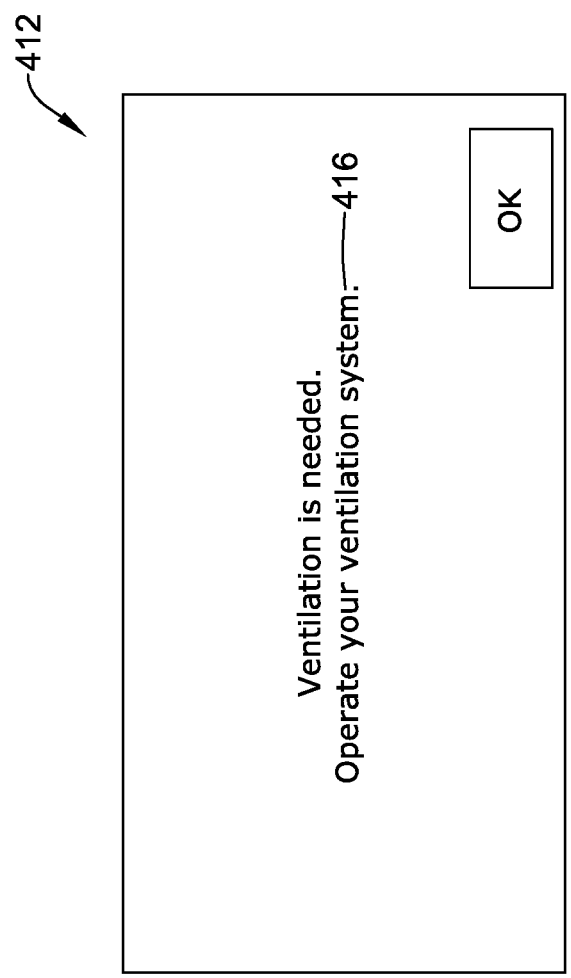

FIG. 12—show exemplary screens that may be displayed to a user upon determining that ventilation is needed or desired. As shown in FIG. 12, screen 400 includes a user prompt 406 indicating that window ventilation is recommended. Screen 412 of FIG. 13 includes a user prompt 416 instructing the user to operate a ventilation system. In some cases, user prompt 416 may include a recommended duration for operation of the ventilation system, but this is not required.

In another illustrative example, as shown in FIG. 14, screen 450 may include a user message 456 predicting when conditions for ventilation are favorable. In some instances, screen 450 may also include a natural language prompt 460 that may query the user about ventilating the building. Screen 450 may include a first checkbox 462a labeled "Yes" and a second checkbox 462b labeled "No" that a user may use to indicate their preference. Upon receiving and accepting the user's response, the processor 114 or controller 218 may send a signal to one or more IAQ components or one or more powered windows to ventilate the building.

Figure 15:
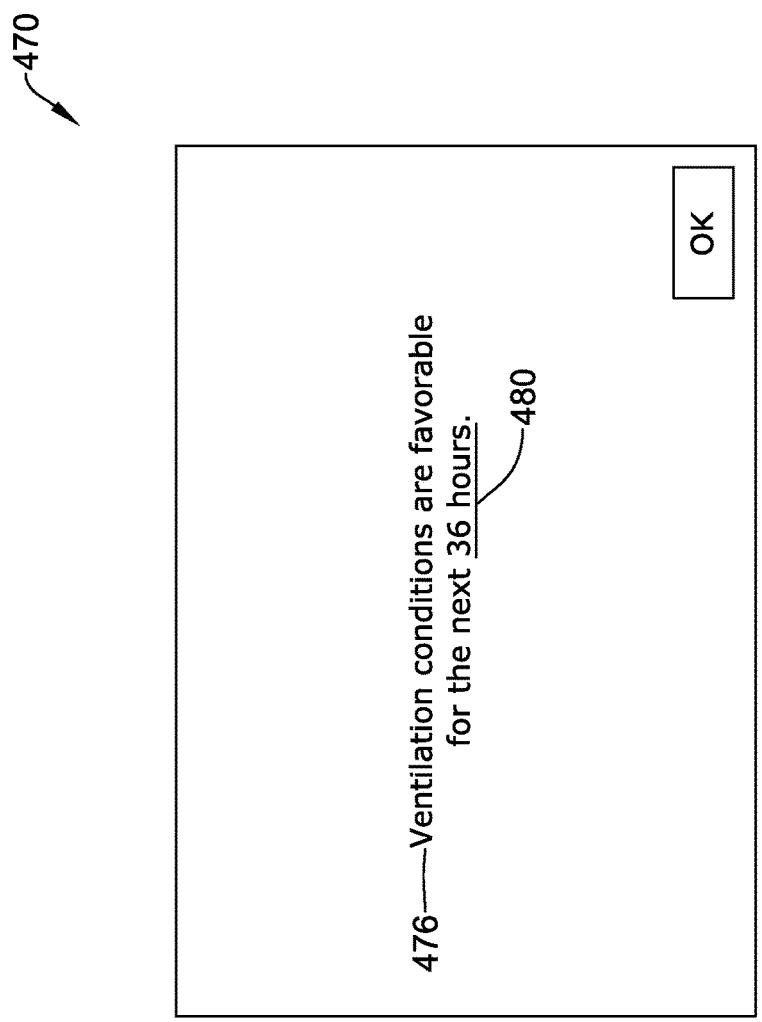

The exemplary screen 470 shown in FIG. 15 is similar to that shown in FIG. 14. As shown in FIG. 15, screen 470 includes a user message 476 that informs the user that ventilation conditions are favorable for a predetermined amount of time (e.g. next 36 hours). Ventilation may be carried out by operation of any mechanical ventilation equipment and/or by opening one or more manual or powered windows. In some cases, the user message 476 may also include a time indictor 480 indicating the amount of time the building is being ventilated. The amount of time displayed by the time indicator may vary depending upon the ventilation needs of the building 2 determined by the processor 114 or controller 218, and may range from a few hours to several days.

Figure 16:
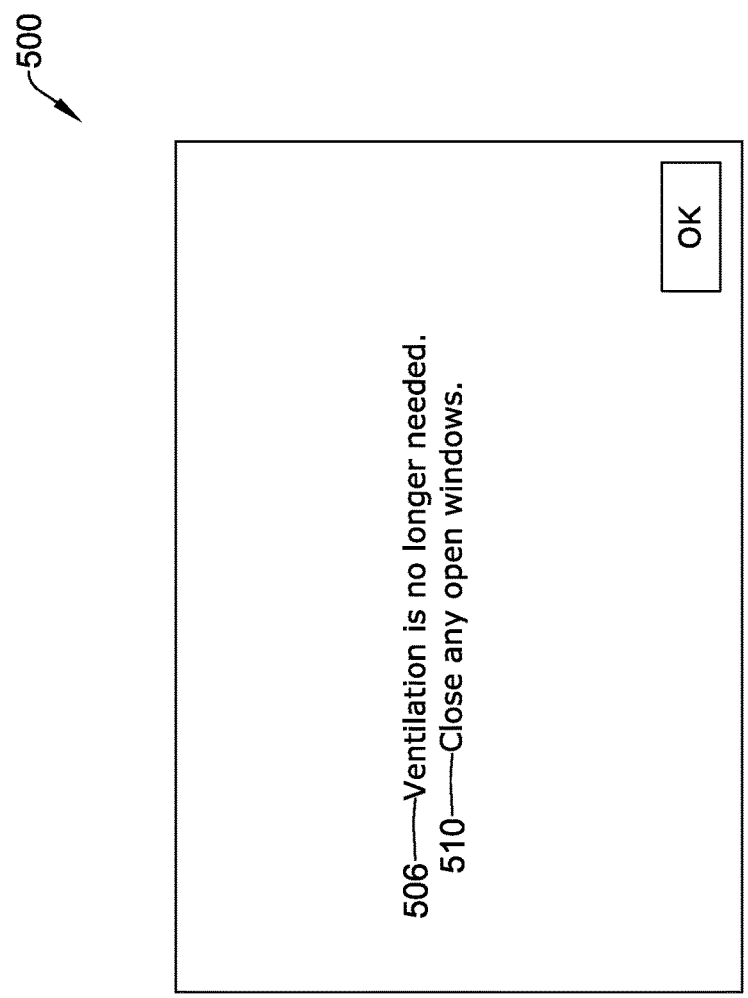
Figure 17:
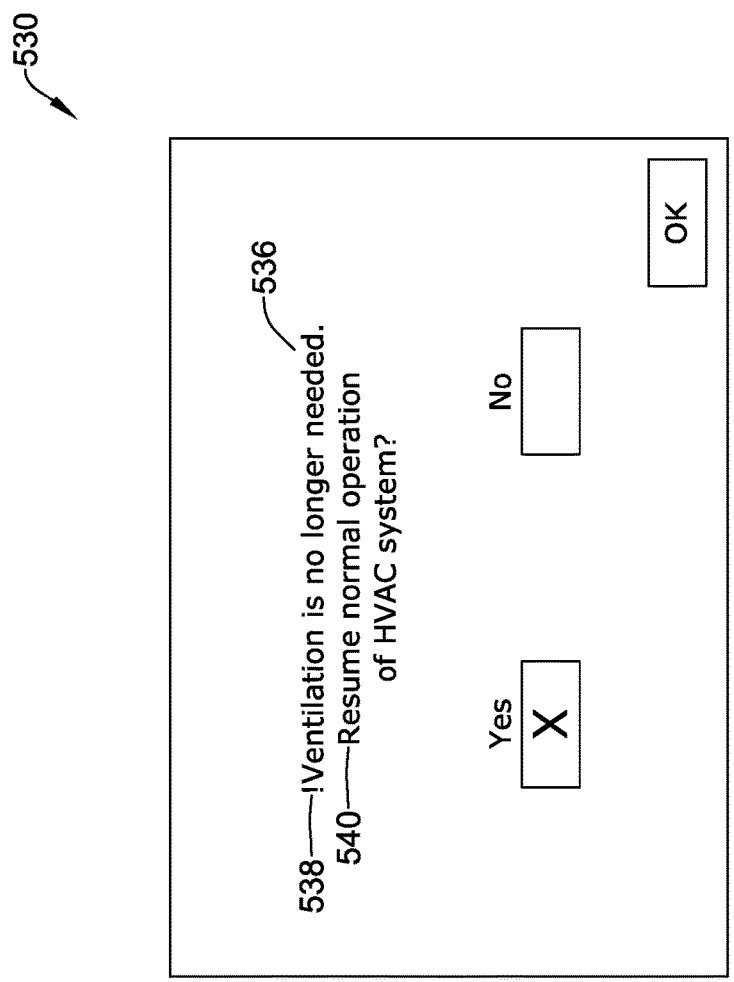

FIGS. 16 and 17 show exemplary screens 500, 530 that may be displayed by the processor 114 or controller 218 upon determining that ventilation is no longer needed and/or recommended. As shown in FIG. 16, screen 500 includes a first user message 506 that notifies a user that ventilation is no longer needed. Additionally, screen 500 may also include a second user message 510 that instructs a user to close any open windows. Similarly, screen 530 includes a first user message 536 that alerts a user that ventilation is no longer needed and/or recommended. In some cases, the first user message 536 may include a symbol 538 such as an exclamation point or other alert symbol displayed adjacent to and/or associated with the first user message. The symbol may visually alert the user that the user message 536 is being displayed. In some cases, screen 530 may include a second user message 540 that may query the user about resuming a normal or scheduled operation of the HVAC system 4. Screen 530 may include a first checkbox 542a labeled "Yes" and a second checkbox 542b labeled "No" that a user may use to indicate their preference. Upon receiving and accepting the user's response, the processor 114 or controller 218 may cause the HVAC controller 18 to send a signal to one or more HVAC components to resume operation according to an operating schedule of the HVAC systemn4 stored in memory.

It will be generally understood that, depending upon the application, the notifications, alerts, and/or messages shown in connection with screens 400, 412, 450, 470, 500 and/or 530 may also be transmitted via SMS text message or email to a user's remote device.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A building controller configured to communicate with and control one or more components of an HVAC system of a building, the building controller comprising:
    an input/output port for sending and/or receiving data over a network;
    a memory for storing one or more operating parameters including one or more user-specified air quality thresholds;
    a user interface; and
    a controller coupled to the input/output port, the memory, and the user interface, the controller configured to:
        receive and accept one or more user-specified air quality thresholds from a user via the user interface;
        receive a first signal indicative of a measure of indoor air quality;
        receive a second signal indicative of a measure of outdoor air quality;
        determine based at least in part on the one or more user-specified air quality thresholds stored in the memory, the measure of indoor air quality, and the measure of outdoor air quality that ventilation via one or more open windows of the building will maintain or improve the measure of indoor air quality relative to the user-specified air quality thresholds; and
        generate an alert in response to determining that ventilation via the one or more open windows of the building will maintain or improve the measure of indoor air quality relative to the user-specified air quality thresholds.

2. The building controller of claim 1, wherein the controller is configured to cause the user interface of the building controller to display the alert when the controller determines that ventilation of the building via the one or more open windows will maintain or improve the measure of indoor air quality relative to the user-specified air quality thresholds.

3. The building controller of claim 1, wherein the controller is further configured to cause a user interface of a mobile computing device to display the alert in response to the controller determining that ventilation of the building via the one or more open windows will maintain or improve the measure of indoor air quality relative to the user-specified air quality thresholds.

4. The building controller according to claim 1, wherein the controller is further configured to receive data indicative of current weather conditions and wherein the controller is further configured to determine if ventilation via the one or more open windows will maintain or improve the measure of indoor air quality relative to the user-specified air quality thresholds based, at least in part, on current weather conditions.

5. The building controller according to claim 1, wherein the controller is further configured to receive data indicative of an air quality index value, and wherein the controller is further configured to determine if ventilation via the one or more open windows will maintain or improve the measure of indoor air quality relative to the user-specified air quality thresholds based, at least in part, on the air quality index value.

6. The building controller according to claim 1, wherein the controller is further configured to receive data indicative of a pollen count, and wherein the controller is further configured to determine if ventilation via the one or more open windows will maintain or improve the measure of indoor air quality relative to the user-specified air quality thresholds based, at least in part, on the pollen count.

7. The building controller according to claim 1, wherein the controller is further configured to receive data indicative of a concentration of at least one air pollutant, and wherein the controller is further configured to determine if ventilation via the one or more open windows will maintain or improve the measure of indoor air quality relative to the user-specified air quality thresholds based, at least in part, on the concentration of the at least one air pollutant.

8. The building controller according to claim 1, wherein the first signal is indicative of an indoor temperature and/or an indoor humidity and wherein the second signal is indicative of an outdoor temperature and/or an outdoor humidity.

9. The building controller according to claim 1, wherein the controller is further configured to operate one or more powered windows to ventilate the building when the controller determines that ventilation via the one or more open windows will maintain or improve the measure of indoor air quality relative to the user-specified air quality thresholds.

10. The building controller according to claim 1, wherein the building controller is a thermostat.

11. The building controller according to claim 1, wherein the one or more user-specified air quality thresholds include an indoor air quality threshold value.

12. The building controller according to claim 1, wherein the one or more user-specified air quality thresholds include an outdoor air quality threshold value.

13. The building controller according to claim 1, wherein at least one of the one or more user-specified air quality thresholds relates to an air quality index value, a pollen count, a smog alert level, an air pollutant concentration, a percent humidity, a dew point, a wind speed, or a chance percent of precipitation.

14. A server connectable to a building controller located within a building over a network, the server comprising:
   a data storage device for storing data indicative of environmental conditions inside of and outside of the building;
   a controller configured to monitor the data indicative of environmental conditions inside of and outside of the building and determine if ventilation of the building via the one or more open windows will maintain or improve a measure of indoor air quality relative to the user-specified air quality thresholds based, at least in part, on the data indicative of environmental conditions inside of and outside of the building; and
   an input/output block for providing an alert to a user when the controller determines that window ventilation of the building will maintain or improve the measure of indoor air quality relative to the user-specified air quality thresholds.

15. The server according to claim 14, wherein the alert is provided to the building controller for presentation to a user of the building controller.

16. The server according to claim 14, wherein the alert is provided to a mobile computing device for presentation to a user of the mobile computing device.

17. The server according to claim 14, wherein the controller determines if ventilation of the building via the one or more open will maintain or improve the measure of indoor air quality relative to the user-specified air quality thresholds based, at least in part, on the data indicative of environmental conditions inside of and outside of the building and on one or more user-specified air quality thresholds.

* * * * *